US008873856B1

United States Patent
Chapleau et al.

(10) Patent No.: US 8,873,856 B1
(45) Date of Patent: *Oct. 28, 2014

(54) DETERMINING A CLASS ASSOCIATED WITH AN IMAGE

(71) Applicant: Matrox Electronic Systems, Ltd., Dorval (CA)

(72) Inventors: Sylvain Chapleau, Laval (CA); Vincent Paquin, L'Ancienne-Lorette (CA)

(73) Assignee: Matrox Electronic Systems, Ltd., Dorval (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/020,934

(22) Filed: Sep. 9, 2013

Related U.S. Application Data

(63) Continuation of application No. 12/836,555, filed on Jul. 14, 2010, now Pat. No. 8,620,078.

(60) Provisional application No. 61/225,544, filed on Jul. 14, 2009.

(51) Int. Cl.
G06K 9/34 (2006.01)
G06K 7/10 (2006.01)
G06K 9/00 (2006.01)

(52) U.S. Cl.
CPC .................................... G06K 9/344 (2013.01)
USPC ............ 382/173; 382/177; 382/321; 382/105

(58) Field of Classification Search
CPC ... G06K 9/344; G06K 2209/01; G06T 7/0081
USPC .......................................... 382/177, 321, 224
See application file for complete search history.

(56) References Cited

U.S. PATENT DOCUMENTS

| 4,377,803 | A | 3/1983 | Lotspiech et al. |
| 5,495,537 | A | 2/1996 | Bedrosian et al. |
| 5,805,747 | A | 9/1998 | Bradford |
| 5,940,524 | A | 8/1999 | Murayama et al. |
| 6,075,875 | A | 6/2000 | Gu |

(Continued)

FOREIGN PATENT DOCUMENTS

| FR | 2660459 | 10/1991 |
| WO | 02/05207 | 1/2002 |

OTHER PUBLICATIONS

Ke Chen, Deliang Wang, and Xiuwen Liu, Weight Adaptation and Oscillatory Correlation for Image Segmentation, IEEE Transactions on Neural Networks, Sep. 2000, 1106-1123, vol. 11, No. 5.

(Continued)

Primary Examiner — Utpal Shah
(74) Attorney, Agent, or Firm — Rhodes Donahoe, LLC

(57) ABSTRACT

The technology is directed to determining a class associated with an image. In some examples, a method determines the class associated with an image. The method can include determining a segmentation score for an image segment based on a comparison of the image segment and a region of an image. The region of the image can be associated with the image segment. The method further includes determining a confidence score for the image segment based on the segmentation score and a classification score. The classification score can be indicative of a similarity between the image segment and at least one class. The method further includes determining a class associated with the image based on the confidence score. The method further includes outputting the class associated with the image.

21 Claims, 15 Drawing Sheets

(56) References Cited

U.S. PATENT DOCUMENTS

| | | |
|---|---|---|
| 6,553,131 B1 | 4/2003 | Neubauer et al. |
| 6,690,828 B2 | 2/2004 | Meyers |
| 6,714,679 B1 | 3/2004 | Scola et al. |
| 6,724,933 B1 | 4/2004 | Lin et al. |
| 6,785,405 B2 | 8/2004 | Tuttle et al. |
| 6,856,697 B2 | 2/2005 | Lee et al. |
| 7,123,761 B2 | 10/2006 | Kawano |
| 7,460,711 B2 | 12/2008 | Baer et al. |
| 8,155,379 B2 | 4/2012 | Nozawa |
| 2006/0210138 A1 | 9/2006 | Hilton et al. |
| 2006/0268980 A1 | 11/2006 | Le Dinh et al. |
| 2007/0058856 A1 | 3/2007 | Boregowda et al. |
| 2008/0226151 A1 | 9/2008 | Zouridakis et al. |
| 2009/0016611 A1 | 1/2009 | Campbell |

OTHER PUBLICATIONS

G. Zouridakis, M. Doshi and N. Mullani, Early Diagnosis of Skin Cancer Based on Segmentation and Measurement of Vascularization and Pigmentation in Nevoscope Images, Proceedings of the 26th Annual International Conference of the IEEE EMBS, Sep. 1-5, 2004, 1593-1596.

Timothee Cour and Jianbo Shi, Recognizing Objects by Piecing Together the Segmentation Puzzle, IEEE Conference on Computer Vision and Pattern Recognition, 2007, 1-8.

Jianmin Dong and Mingquan Zhou, Medical Image Segmentation Based on Topology Correlation of Regions, International Conference on BioMedical Engineering and Informatics, May 2008, 142-146, vol. 2.

DETERMINING A CLASS ASSOCIATED WITH AN IMAGE

CROSS REFERENCES TO RELATED APPLICATIONS

This application is a continuation application of co-pending U.S. patent application Ser. No. 12/836,555, filed on Jul. 14, 2010, entitled "DETERMINING A CLASS ASSOCIATED WITH AN IMAGE", which claims priority under 35 U.S.C. §119(e) to the provisional patent application entitled "Determining a Classification of an Image Segment," U.S. Provisional Patent Application No. 61/225,544, filed on Jul. 14, 2009, the disclosure of each of the preceding applications is hereby incorporated herein by reference in their entirety.

FIELD OF THE INVENTION

The present invention relates generally to determining a class associated with an image.

BACKGROUND

The process of recognizing one or more objects or patterns in an image is object or pattern recognition (e.g., optical character recognition, face detection, vehicle detection, etc.). Object recognition has applications in a variety of fields, such as automated manufacturing, biomedical engineering, security, and document analysis.

Optical character recognition (OCR) consists of recognizing a string of characters in an image and returning a corresponding string of characters (e.g., in text form). OCR has a wide range of applications including the recognition of vehicle license plate numbers (e.g., for use in automated traffic law enforcement, surveillance, access control, tolls, etc.), the recognition of serial numbers on parts in an automated manufacturing environment, the recognition of labels on packages for routing purposes, and various document analysis applications.

The utilization of object recognition for a machine vision system is challenging due to image issues such as: changes in character angle with respect to a string, aspect ratio, scale, skew, lighting (e.g., non-uniform, reflection), and overlapping images.

Thus, a need exists to improve the determination of a class associated with an image as described herein.

SUMMARY

One approach to determining a class associated with an image is a method. The method includes determining a segmentation score for an image segment based on a comparison of the image segment and a region of an image. The region of the image is associated with the image segment. The method further includes determining a confidence score for the image segment based on the segmentation score and a classification score. The classification score is indicative of a similarity between the image segment and at least one class. The method further includes determining a class associated with the image based on the confidence score. The method further includes outputting the class associated with the image.

Another approach to determining a class associated with an image is a computer program product. The computer program product is tangibly embodied in an information carrier. The computer program product includes instructions being operable to cause a data processing apparatus to determine a segmentation score for an image segment based on a comparison of the image segment and a region of an image. The region of the image is associated with the image segment. The computer program product further includes instructions being operable to cause a data processing apparatus to determine a confidence score for the image segment based on the segmentation score and a classification score. The classification score is indicative of a similarity between the image segment and at least one class. The computer program product further includes instructions being operable to cause a data processing apparatus to determine a class associated with the image based on the confidence score. The computer program product further includes instructions being operable to cause a data processing apparatus to output the class associated with the image.

Another approach to determining a class associated with an image is a system. The system includes a segmentation score module, a confidence score module, a class determination module, and a class output module. The segmentation score module is configured to determine a segmentation score for an image segment based on a comparison of the image segment and a region of an image. The region of the image is associated with the image segment. The confidence score module is configured to determine a confidence score for the image segment based on the segmentation score and a classification score. The classification score is indicative of a similarity between the image segment and at least one class. The class determination module is configured to determine a class associated with the image based on the confidence score. The class output module is configured to output the class associated with the image.

In other examples, any of the approaches above can include one or more of the following features.

In some examples, the method further includes determining a second segmentation score for a second image segment based on a comparison of the second image segment and a second region of the image. The second region of the image is associated with the second image segment.

In other examples, the method further includes determining a second confidence score for the second image segment based on the second segmentation score and a second classification score. The second classification score is indicative of a similarity between the second image segment and at least one class.

In some examples, the method further including determining the class associated with the image based on the confidence score and the second confidence score.

In other examples, the method further includes generating the image segment based on a first segmentation of the image and/or generating the second image segment based on a second segmentation of the image. The second image segment can be associated with the region of the image associated with the image segment.

In some examples, the method further includes generating the image segment and the second image segment based on segmentation of substantially distinct regions of the image.

In other examples, the method further includes comparing pixels of the image segment with pixels of the region of the image to form the comparison of the image segment and the region of an image.

In some examples, the method further includes determining the classification score indicative of the similarity between the image segment and the at least one class.

In other examples, the method further includes determining the at least one class based on a comparison of the image segment with a plurality of classes. Each of the plurality of classes is associated with a character.

In some examples, the method further includes receiving the image from an image acquisition device, binarizing the image to form a binarized image and segmenting the binarized image based on objects within the binarized image to form the image segment.

In other examples, wherein the determining the class associated with the image further includes determining the class associated with the image based on the confidence score by comparing the confidence score to a threshold value.

In some examples, the system further includes the segmentation score module further configured to determine a second segmentation score for a second image segment based on a comparison of the second image segment and a second region of the image. The second region of the image can be associated with the second image segment.

In other examples, the system further includes the confidence score module further configured to determine a second confidence score for the second image segment based on the second segmentation score and a second classification score. The second classification score can be indicative of a similarity between the second image segment and at least one class.

In some examples, the system further includes the class determination module further configured to determine the class associated with the image based on the confidence score and the second confidence score.

In other examples, the system further includes a segmentation module configured to generate the image segment based on a first segmentation of the image; and generate the second image segment based on a second segmentation of the image. The second image segment can be associated with the region of the image associated with the image segment.

In some examples, the system further includes a segmentation module configured to generate the image segment and the second image segment based on segmentation of substantially distinct regions of the image.

In other examples, the system further includes the segmentation score module further configured to compare pixels of the image segment with pixels of the region of the image to form the comparison of the image segment and the region of an image.

In some examples, the system further includes a classification score module configured to determine the classification score indicative of the similarity between the image segment and the at least one class.

In other examples, the system further includes a classification score module configured to determine the at least one class based on a comparison of the image segment with a plurality of classes. Each of the plurality of classes can be associated with a character.

In some examples, the system further includes an image acquisition module configured to receive the image. The system can further include a segmentation module configured to binarize the image to form a binarized image and segment the binarized image based on objects within the binarized image to form the image segment.

In other examples, the system further includes the class determination module further configured to determine the class associated with the image based on the confidence score by comparing the confidence score to a threshold value.

The class determination techniques described herein can provide one or more of the following advantages. An advantage of the technology is the ability to identity characters in a string with a known or unknown number of evenly or proportionally spaced characters, thereby enabling increased efficiency in optical character recognition (OCR) applications by not requiring a known number of evenly spaced characters.

An additional advantage of the technology is that the integration of the segmentation score and the classification score in the determination of the confidence score enables the identification of classes (e.g., characters, numbers, symbols, etc.) that do not use a model or template (e.g., known character font, known symbol location and orientation, etc.), thereby increasing the efficiency of the technology across a wide range of applications (e.g., machine component identification, multi-nation vehicle tag identification, etc.). Another advantage of the technology is that use of classes that can be trained to identify the image segment enables the identification of strings that are uneven, skewed, or have other deformities, thereby increasing the industrial applications of the technology to any type of application via the use of a training set of sample objects.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DETAILED DESCRIPTION

Figure 1:
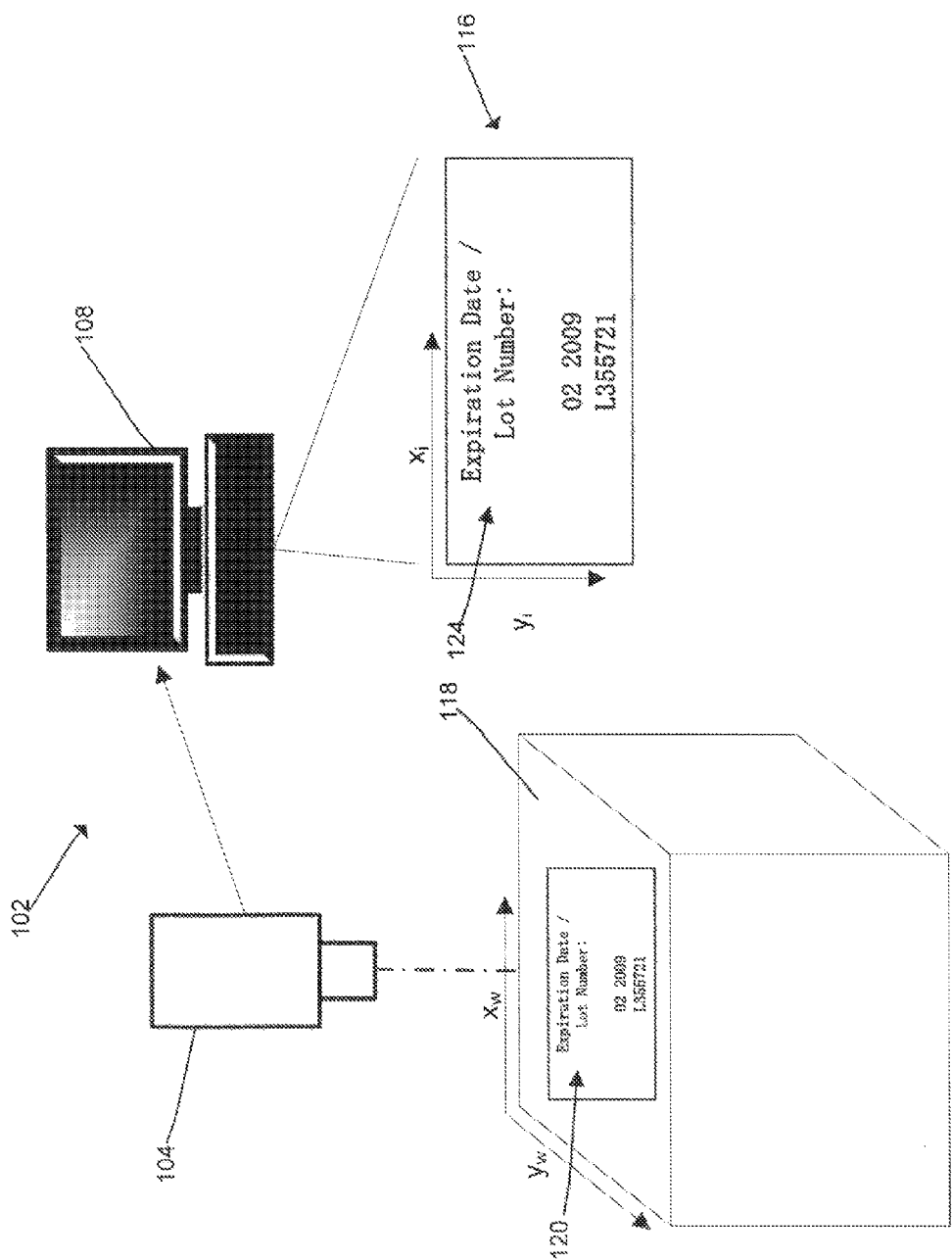
FIG. 1 schematically illustrates an exemplary machine vision system.

As a general overview of the technology, the technology is directed to classifying an image based on one or more classes. For example, a class can be associated with a physical entity (e.g., manufactured part, vehicle, person, animal, organ, etc.), a character (e.g., alphanumeric character), and/or a character string (e.g., word, serial number, etc.). The class can be utilized in various machine vision applications (e.g., optical character recognition (OCR), parts identification, security screening, face detection, license plate number recognition, etc.).

For example, in an image containing the text "LZ8342", six image segments can be isolated and classified as classes "Letter L", "Letter Z", "Digit 8", "Digit 3", "Digit 4", and "Digit 2". These classes can then be output to a requesting application, such as an automated toll collection or garage entry system based on license plate numbers, mail sorting system, medical diagnostic application, and/or any other type of application that utilizes image classes.

As another example, an image depicting a vehicle entering a parking garage is analyzed to determine the vehicle make, model, color, and year (e.g., for a statistical analysis of the vehicles parked in a parking garage, for an automated analysis for building security, etc.). The technology analyzes the image to isolate the vehicle in the image and determine the vehicle make, model, color, and year based on classifications of vehicles (e.g., a classification for every vehicle manufactured in the world, etc.). The technology can advantageously identify objects in an image with known or unknown parameters (e.g., lighting, angle, color, modifications, accessories, etc.), thereby enabling increased efficiency in object recognition applications by not requiring set parameters for the image (e.g., no modifications to vehicle, no accessories on the vehicle, no color variations, etc.).

As a further general overview of the technology, the technology can include, for example, one or more of the following steps. It should be understood that the following steps can occur in any order and/or can be executed on any type of computing system or device that can execute computer-executable instructions (e.g., a personal computer, a network server, an intelligent camera, a stand-alone image processor, a mobile device, etc.).

In a first step, an image (e.g., grayscale image, color image, binary image, color filter array or bayer image, etc.) including one or more objects to be recognized is acquired. This step can be referred to as "image acquisition," and the image can be referred to as "image" or "acquired image" or "original image." It should be understood that various image processing operations (e.g., format conversion, compression/decompression, demosaicing, cropping, noise reduction, contrast enhancement, filtering, morphological transformation, etc.) can be applied to the image before the image is processed as described herein. Thus, the image processed by the technology described herein can be the acquired image or a processed version of the acquired image. Also, it should be understood that any means of image acquisition (e.g., camera, scanner, image database, etc.) known in the art can be used. For example, the image can be acquired from a digital or analog camera connected, directly or indirectly, to the computing system (or device) or acquired from a database of images stored locally on the computing system or remotely (e.g., on a network server).

Figure 11:
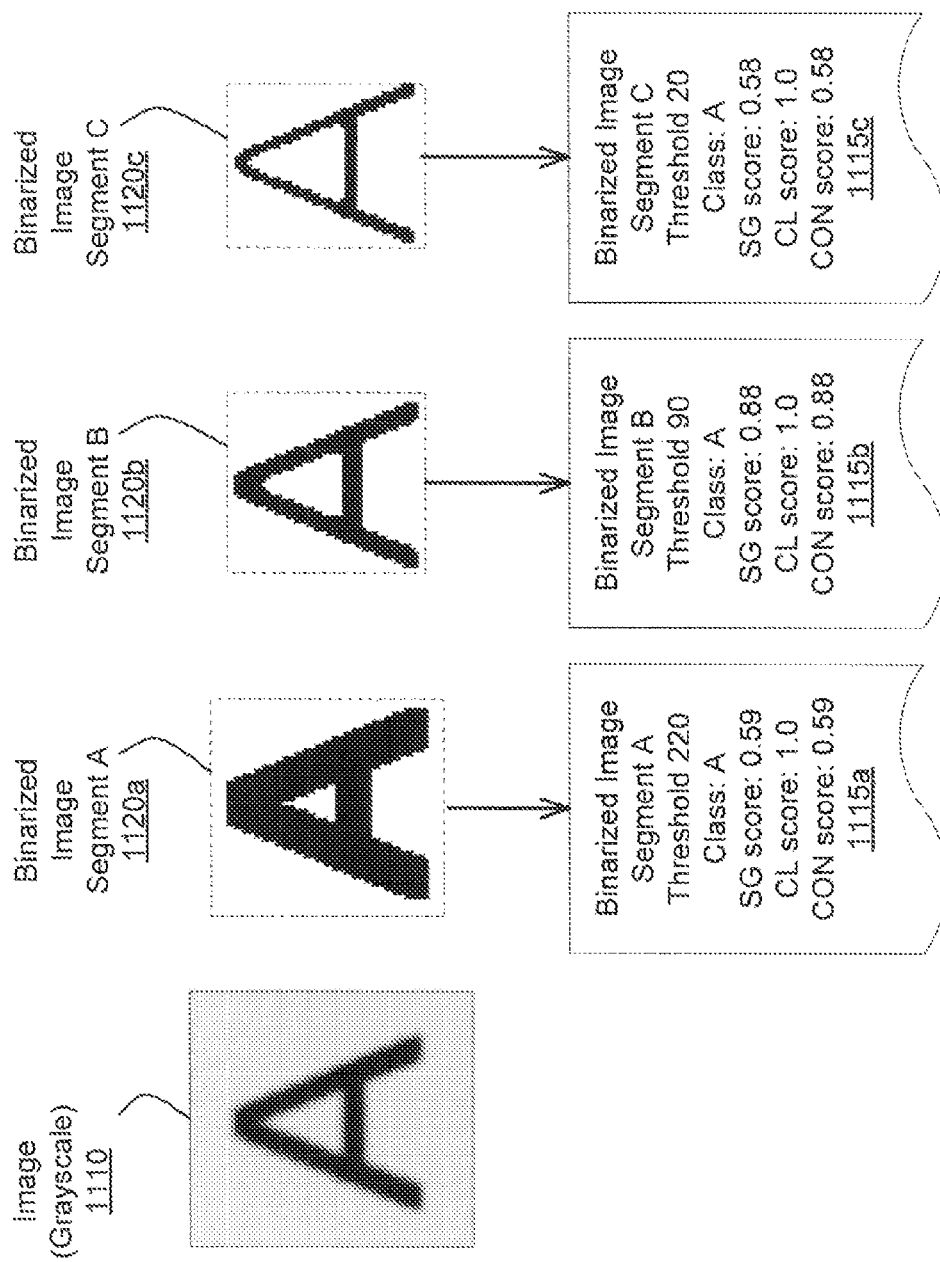
FIG. 11 depicts an image and three binarized image segments with associated scores.

In a second step, the image is analyzed to isolate individual objects from each other and from the background. This step can be referred to as "segmentation." The individual objects isolated in the image can be referred to as "image segments." The segmentation step can include one or more pre-processing operations and/or processing operations. This segmentation step can be repeated using different segmentation techniques, segmentation parameters, and/or segmentation pre-processing operations to form a plurality of image segments for each region in the image (each region containing, for example, a single object to be recognized). For example, as illustrated in FIG. 11, multiple image segments 1120a, 1120b and 1120c can be generated, using different segmentation parameters, from an image 1110 depicting a single character "A".

For example, the segmentation of an image can be performed in two steps. First, the image is binarized by applying a global or local threshold value to each pixel. This step can be referred to as "binarization" and the output can be referred to as "binarized image." Second, connected pixels of the same binary value are grouped into objects. This step can be referred to as "connected component" or "blob" analysis and the output can be referred to as "binarized image segments." If the image is binarized and the individual objects are isolated in the binarized image, the individual objects isolated in the binarized image can be referred to as "binarized image segments."

In some examples, the segmentation of an image can further include a step of combining or merging the connected components. For example, an image segment representing a complete letter "i" can be obtained by combining two connected components corresponding to the dot and the body, or an image segment representing a complete letter "L" can be obtained by merging two connected components corresponding to the vertical and horizontal bars (which may have been split during the image acquisition or binarization process, for example).

In other examples, the image segments can be obtained utilizing other segmentation techniques known in the art, such as, segmentation techniques based directly on the grayscale or color image, based on detected edges or contours, based on horizontal and/or vertical intensity projections, based on detected corners, watershed transformations, etc., and the output can be referred to as "image segments." The image segments can refer to the binarized image segments and/or the image segments obtained by other techniques. It should be understood that any suitable technique of segmentation, binarization, and/or connected component analysis known in the art can be utilized.

In a third step, a "segmentation score" is determined based on a comparison of an image segment and a corresponding region in the non-segmented image (e.g., in the acquired grayscale or color image or in a processed version thereof). The segmentation score can provide a measure of confidence of the segmentation of the image segment indicating to what degree the image segment "resembles" the corresponding region in the non-segmented image. In the case of multiple image segments, such as resulting from the segmentation of an image or region containing multiple objects and/or from multiple segmentations of an image or region containing a single object, a segmentation score can be determined for each of the image segments.

In a fourth step, a classification score is determined for an image segment. The classification score can indicate the degree to which the image segment exhibits the characteristics associated with a particular class. For example, the classification score can be a score returned by a "classifier", such as a "statistical" or "artificial intelligence"-based classifier.

In the case of a single class, a classifier can classify the image segment as belonging or not to a particular class or category of objects. For example, a classifier for the alphanumeric character class "A" can classify an image segment (e.g., representing an isolated character) as belonging or not to the alphanumeric character class "A". As another example, the classifier for a part class "widget" can classify an image segment (e.g., representing a single part in a machine) as belonging or not to the part class "widget".

The classifier can return a classification score representing the confidence with which the classifier classifies the image segment as belonging to the particular class. For example, the classification score can indicate the degree to which the image segment exhibits the characteristics associated with the particular class (e.g., characteristics of a letter, part, human, vehicle, etc.). For example, characteristics can include geometric features or feature vectors, geometric moments, edge or contour characteristics, skeleton characteristics, wavelet transformation coefficients, number of holes, etc., as well as any combination of these and/or other characteristics.

In the case of multiple classes (e.g., character classes A-Z and 0-9, multiple part classes, etc.), the classifier can, for example, determine a classification score for the image segment and each of the classes, in turn, and then return one or more classes that yielded the highest classification scores.

In the case of multiple image segments, such as resulting from multiple objects and/or multiple segmentations, a classification score can be determined for each of the image segments.

In a fifth step, a "confidence score" is determined for an image segment based on the segmentation score and the classification score (e.g., by multiplying the segmentation score and the classification score, by adding the segmentation score and the classification score, by averaging the segmentation score and the classification score, by weighting the segmentation score and the classification score, etc.). The confidence score can be indicative of the degree to which the non-segmented image (or a region of the non-segmented image corresponding to the image segment) exhibits the characteristics associated with the particular class or the confidence with which a classifier would classify the non-segmented image (or image region) as belonging to the particular class. As mentioned, the non-segmented image can be the acquired grayscale or color image or a processed version thereof. In the case of multiple image segments, such as resulting from multiple objects and/or multiple segmentations, a confidence score can be determined for each of the image segments.

In a sixth step, a class associated with the image is determined based on the confidence score. In the case of a single image segment, the image segment and its corresponding classification can be validated or rejected based on the confidence score and one or more criteria, such as, by comparing the confidence score to a threshold value (e.g., defined by the user, dynamically generated based on the image, etc.). In the case of multiple image segments, one or more of the image segments and their corresponding classifications can be selected based on the confidence scores and one or more criteria. For example, the criteria can include: Selecting a predefined number of the image segments and their corresponding classifications that yielded the highest confidence scores; Selecting all or a predefined number of the image segments and their corresponding classifications whose confidence scores are above a threshold value; etc. Note that the threshold value can be predefined (e.g., defined by the user) or dynamically determined (e.g., determined based on the average, mean, median, deviation from the mean or mode of the confidence scores of other image segments associated with the image, etc.).

In a final step, the determined class or classes associated with the image are output. The corresponding confidence score(s) and/or image segment(s) can also be output, as required by the application. The output class can be, for example, the ASCII character corresponding to the character class (e.g., A, B, etc.), a class index (e.g., class A5, class C523, etc.), a "NULL" identifier (e.g., if the classification failed) and/or any other type of class identifier. The class(es), confidence score(s) and/or image segment(s) can be output to a display device (e.g., computer monitor, etc.), a computer application program (e.g., for quality assurance, access control, etc.), an output device (e.g., printer, text to speech converter, etc.), and/or any other type of output mechanism (e.g., sent via a transmission control protocol packet to another computing system, sent via an application program interface (API) return call to a requesting computer executable program, sent via a simple object access protocol (SOAP) message to a factory machine, etc.).

An advantage of the technology is that the integration of the segmentation score and the classification score in the determination of the confidence score enables the identification of classes (e.g., characters, numbers, symbols, parts, vehicles, animals, humans, etc.) that do not use a model or template (e.g., known character font, known symbol location and orientation, known background, known lighting, known size, etc.), thereby increasing the efficiency of the technology across a wide range of applications (e.g., machine component identification, multi-nation vehicle tag identification, security identification, etc.). Another advantage of the technology is that use of classes that can be trained to identify the image segment enables the identification of strings that are uneven, skewed, or have other deformities, thereby increasing the industrial applications of the technology to any type of application via the use of a training set of sample objects.

FIG. 1 schematically illustrates an exemplary machine vision system 102. As shown in FIG. 1, the system 102 includes an image acquisition device 104 for acquiring an image 116 and an image processor 108 for analyzing the acquired image 116 (and, if desired, displaying the acquired image and/or any analysis results). The image processor 108 can be provided as any suitable combination of hardware and software, such as, for example, a suitably programmed computer.

The image acquisition device 104 (which may, for example, be a digital camera) is arranged to acquire an image of a desired field of view within a world space of the system 102. This world space may, for example, be defined within an inspection station (not shown) of a production line, in order to enable recognition and localization of objects passing through the inspection station (e.g., part number, lot number, expiration date, shipping date, shipping identification, etc.). It should be understood that other types of image acquisition devices (e.g., electromagnetic imaging devices such as radar and nuclear magnetic resonance imaging systems; or ultrasonic imaging systems etc.) can be employed, as can be appropriate for the desired view. In any event, the world space definition includes a world surface 118 providing a visual reference frame.

The system 102 operates to recognize one or more objects 120 laying on the world surface 118. The system 102 can detect objects 124 in the image 116 and can determine a classification for one or more of the detected objects 124 (such as, the classifications—"zero" "two" "two" "zero" "zero" "nine"). The system 102 outputs the classifications for the objects and/or any other associated information (e.g., the confidence scores, the image with the detected objects in annotation, etc.) to a display device and/or to another computer-executable program (e.g., quality assurance computer application, software operating a robotic arm, etc.) of the system 102 or of a remote system (not shown).

The segmentation step as described herein can be essential to the overall object recognition process. Poor image segmentation can result in incorrect classification of the objects appearing in the non-segmented image (e.g., the acquired grayscale or color image or a processed version thereof). The importance of the segmentation step is illustrated by the OCR examples of FIGS. 2-4.

Figure 2:
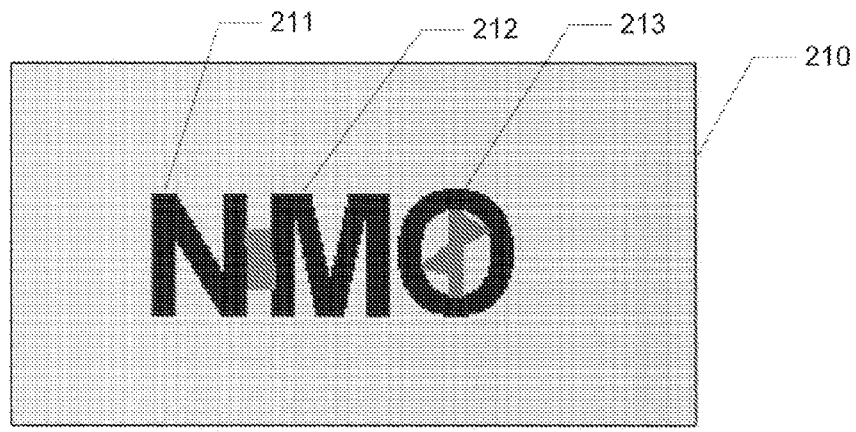
FIG. 2 illustrates a grayscale image containing objects to be classified.

FIG. 2 illustrates a grayscale image 210 containing objects 211, 212 and 213 to be classified. The objects 211 and 212 are characters, while the object 213 is an irrelevant object (e.g., a logo, ornamental design, etc.).

Figure 3:
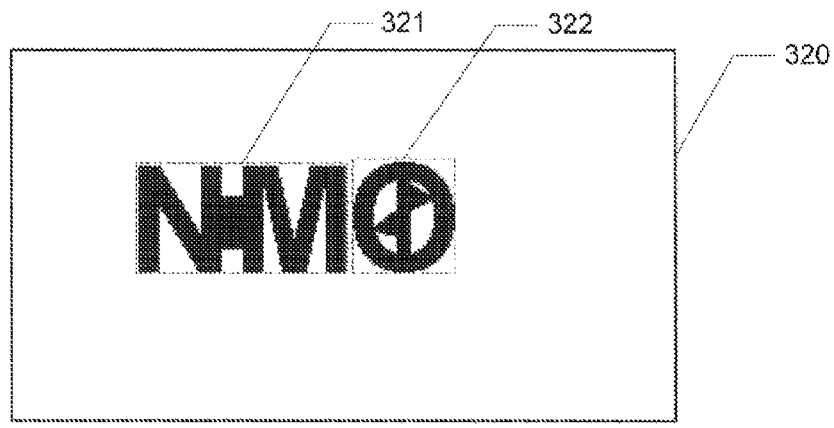
FIG. 3 illustrates a binary image resulting from a binarization of a grayscale image.

FIG. 3 illustrates a binary image 320 resulting from the binarization of the grayscale image 210 by global thresholding at a first threshold value and image segments 321 and 322 obtained by grouping connected pixels in binary image 320. The object 213 in the grayscale image 210 is properly segmented into the image segment 322. The image segment 322 accurately represents the object 213 and is not classified as a character. However, objects 211 and 212 in the grayscale image 210 are incorrectly merged into the single image segment 321 and the classification of the image segment 321 fails.

Figure 4:
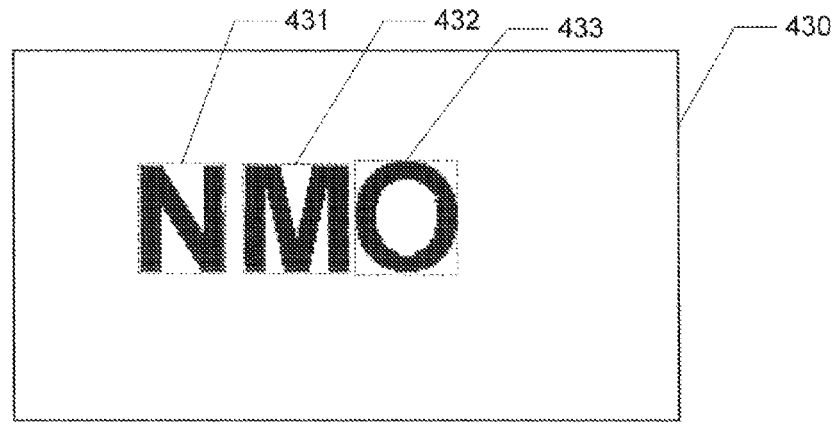
FIG. 4 illustrates another binary image resulting from a binarization of a grayscale image.

FIG. 4 illustrates a binary image 430 resulting from the binarization of the grayscale image 210 by global thresholding at a second threshold value and image segments 431, 432 and 433 obtained by grouping connected pixels in the binary image 430. At the second threshold value, objects 211 and 212 in the grayscale image 210 are properly segmented into the two image segments 431 and 432, which can be correctly classified as an "N" and "M", respectively. However, the object 213 of the grayscale image 210 is no longer properly segmented. Although the object 213 in the grayscale image 210 does not resemble a character, the corresponding image segment 433 resembles the character "0" and can be incorrectly classified as such.

As illustrated, it is not always possible to find a threshold value that properly segments all objects appearing in the original grayscale image. The problem is that classification is based on the segmented object in the binary image, not on the object as it appears in the original grayscale or color image. In FIGS. 3 and 4, the accuracy of the segmentation process is not taken into account during classification and thus, image segments in FIG. 4 are improperly classified as a character. An advantage of confidence score is that the determination of the confidence score utilizes both the segmentation score, i.e., the accuracy of the segmentation process, and the classification score, i.e., the accuracy of the classification process, to determine the classification of an image segment, thereby decreasing mis-classifications and increasing the accuracy of the technology. Another advantage of the technology is the recursive determinations of the segmentation score (e.g., determining the segmentation score for multiple image segments associated with the same region of the image) and the classification score (e.g., comparing each image segment to every classification) to determine the image segment with the highest confidence score, thereby decreasing mis-classifications by identifying the image segment that closely resembles the region in the image.

Figure 5:
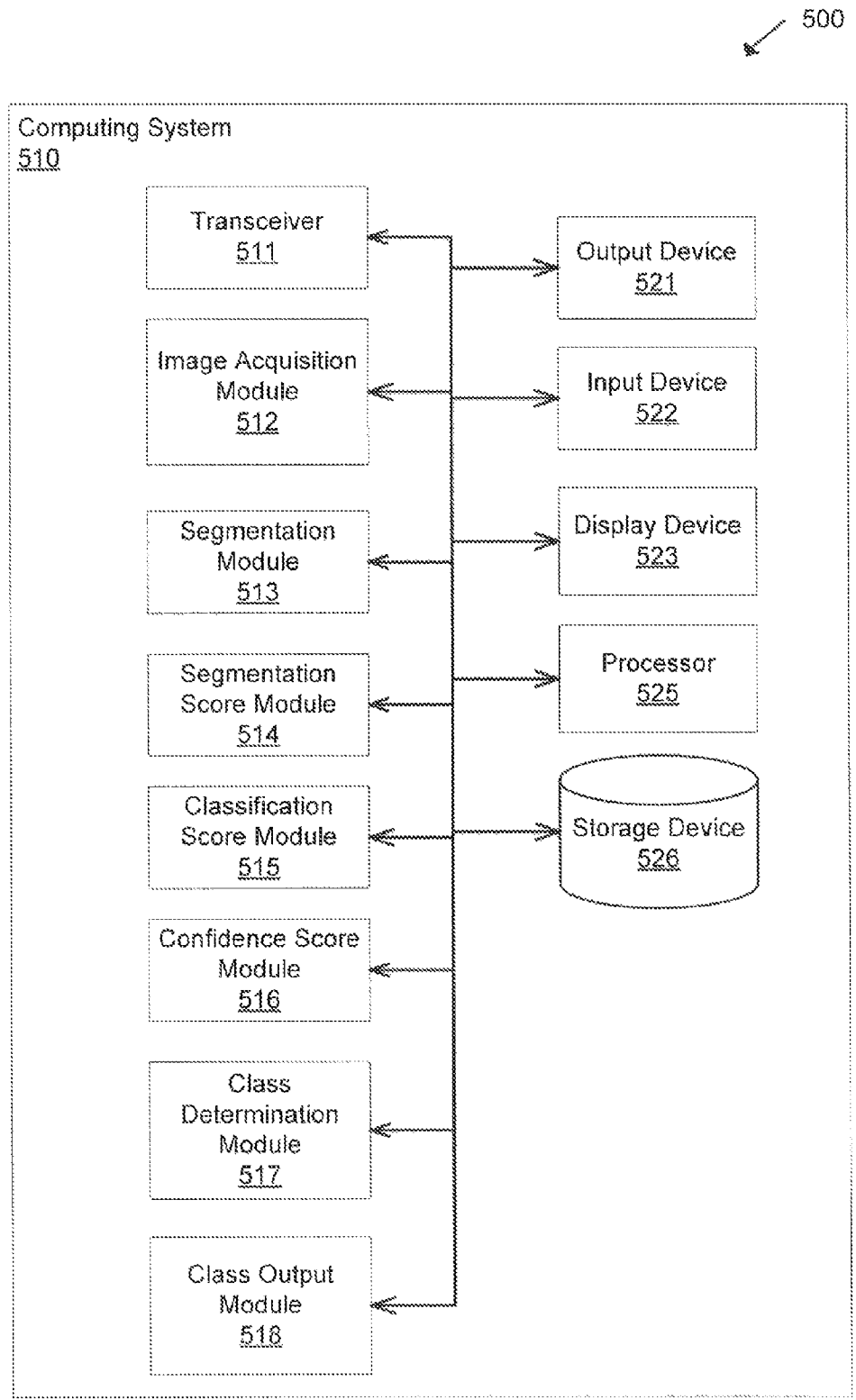
FIG. 5 depicts a block diagram of an exemplary machine vision system.

FIG. 5 depicts a block diagram of an exemplary machine vision system 500. The machine vision system 500 includes a computing system 510. The computing system 510 includes a transceiver 511, an image acquisition module 512, a segmentation module 513, a segmentation score module 514, a classification score module 515, a confidence score module 516, a class determination module 517, a class output module 518, an output device 521, an input device 522, a display device 523, a processor 525, and a storage device 526. The modules and devices described herein can, for example, utilize the processor 525 to execute computer-executable instructions and/or include their own processor or dedicated hardware (e.g., a graphics processing unit, a field programmable gate array (FPGA), an application specific integrated circuit (ASIC), etc.). It should be understood that the computing system 510 is exemplary only and can include, for example, other modules, devices, and/or processors known in the art and/or not include some of the modules or devices illustrated in FIG. 5.

The transceiver 511 transmits and/or receives images, classifications, confidence scores and/or other data (e.g., user preferences, analysis results, configuration parameters, system information, etc.) to/from the computing system 510.

The image acquisition module 512 receives an image from an image acquisition device (not shown), from storage device 526, from transceiver 511, from input device 522, etc.

The segmentation module 513 generates the image segment(s) based on a segmentation of the image. The segmentation module 513 can generate the image segment(s) utilizing any of the techniques described herein.

The segmentation score module 514 determines a segmentation score for an image segment based on a comparison of the image segment and a region of an image. The region of the image is associated with the image segment. The segmentation score module 514 can determine the segmentation score utilizing any of the techniques described herein.

The classification score module 515 determines the classification score indicative of the similarity between the image segment and the at least one class. The classification score module 515 can determine the classification score utilizing any of the techniques described herein.

The confidence score module 516 determines a confidence score for the image segment based on the segmentation score and a classification score. The confidence score module 516 can determine the confidence score utilizing any of the techniques described herein.

The class determination module 517 determines a class associated with the image based on the confidence score. The class determination module 517 can determine the class utilizing any of the techniques described herein.

The class output module 518 outputs the class associated with image. The class output module 518 can output the class utilizing any of the techniques described herein.

The output device 521 outputs images, image segments, classifications, scores and/or any other data associated with the computing system 510 to a printer, speaker, etc. The input device 522 receives information associated with the computing system 510 (e.g., user-defined criteria, user specifications, etc.) from a user (not shown) and/or another computing system (not shown). The input device 522 can include, for example, a keyboard, mouse, touchscreen, scanner, etc.

The display device 523 displays the images, image segments, classifications, scores and/or any other data associated with the computing system 510. The processor 525 executes the operating system and/or any other computer-executable instructions for the computing system 510 (e.g., any of modules 512 to 518, a graphical user interface, other application programs, etc.).

The storage device 526 stores images, image segments, classifications, scores, and/or any other data associated with the computing system 510. The storage device 526 can include, for example, long-term storage (e.g., a hard drive, a tape storage device, flash memory, etc.), short-term storage (e.g., a random access memory, a graphics memory, etc.), and/or any other type of computer readable storage.

Figure 6:
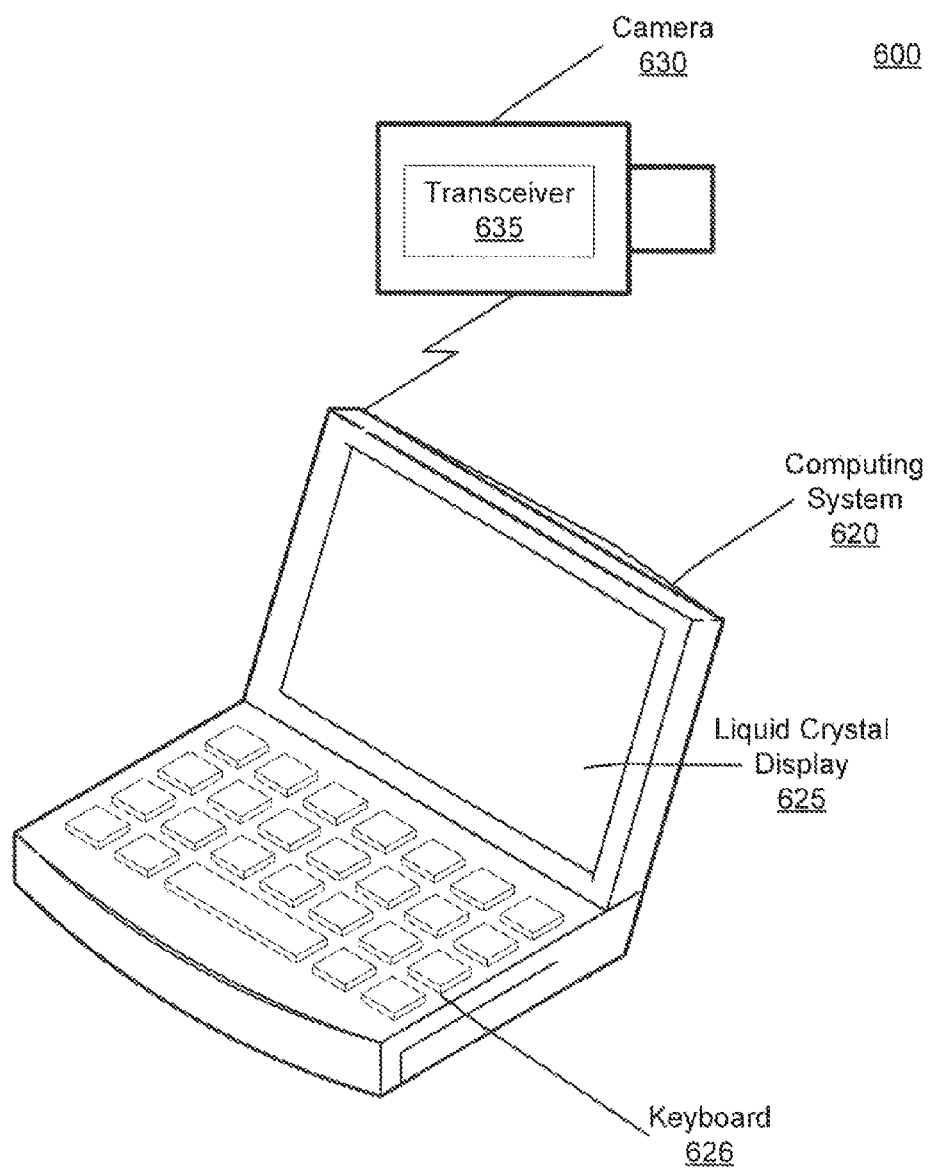
FIG. 6 depicts a block diagram of another exemplary machine vision system.

FIG. 6 depicts a block diagram of another exemplary machine vision system 600. The machine vision system 600 includes a computing system 620 and a camera 630. The computing system 620 includes a liquid crystal display (LCD) 625 and a keyboard 626. The camera 630 includes a transceiver 635. The camera 630 acquires an image and the transceiver 635 communicates (e.g., wired, wireless, etc.) the image to the computing system 620. The computing system 620 processes the image to determine a class associated with the image. It should be understood that the computing system 620 can include, for example, one or more of the components (e.g., modules, devices, etc.) of the computing system 510.

For example, the camera 630 acquires the image 210 illustrated in FIG. 2. The camera 630 transmits the image 210 to the computing system 620 via the transceiver 625. The computing system 620 analyzes the image 210 utilizing the technology as described herein and outputs the class associated with the image based on the confidence scores determined for each image segment utilizing the different thresholds. In other words, the computing system 620 determines that the image 210 includes the classes of "N" "M" and NULL utilizing both of the binary images 320 and 430.

Figure 7:
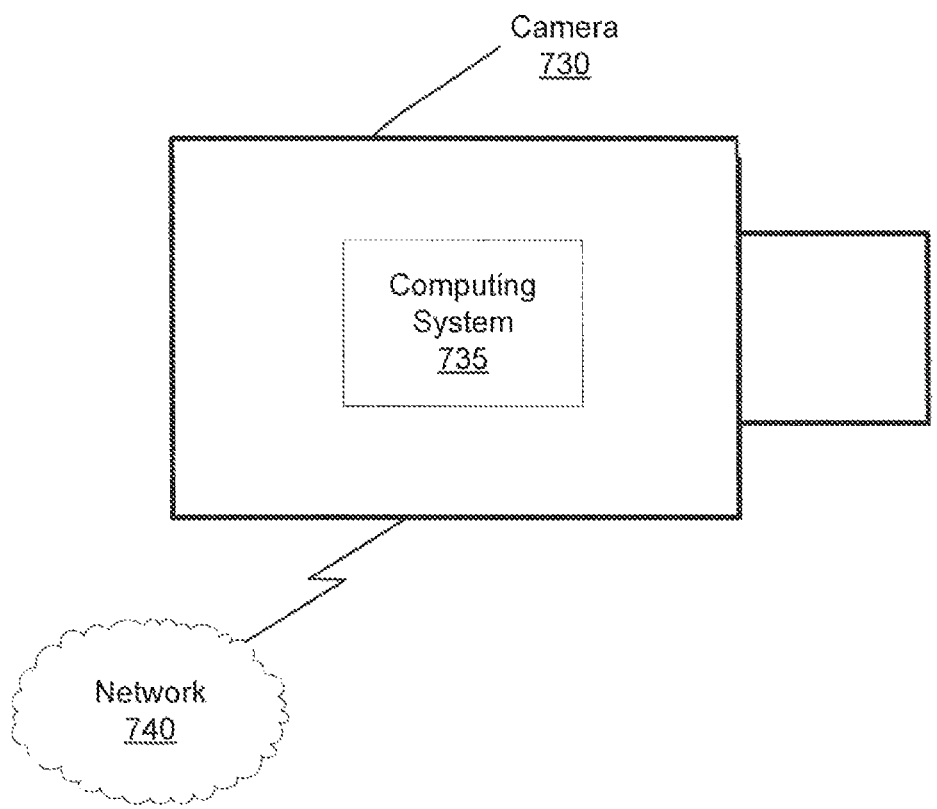
FIG. 7 depicts a block diagram of another exemplary machine vision system.

FIG. 7 depicts a block diagram of another exemplary machine vision system 700. the machine vision system 700 includes a camera 730 and a network 740. The camera 730 includes a computing system 735. The camera 730 acquires an image and the computing system 735 processes the image to determine a class utilizing the technology as described herein. The computing system 735 can communicate the determined class and/or the image to other devices (not shown) utilizing the network 740. It should be understood that the computing system 735 can include, for example, one or more of the components (e.g., modules, devices, etc.) of the computing system 510.

Figure 8:
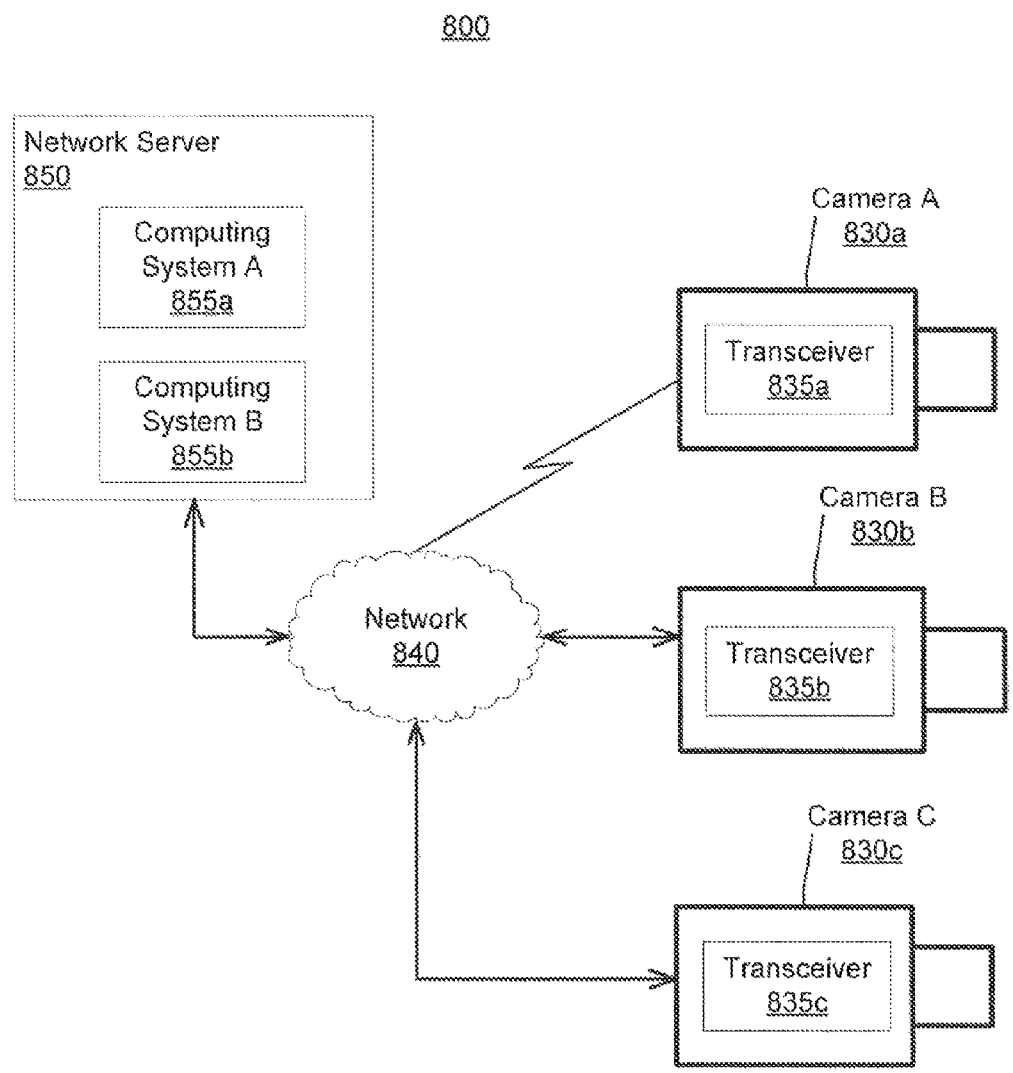
FIG. 8 depicts a block diagram of another exemplary machine vision system.

FIG. 8 depicts a block diagram of another exemplary machine vision system 800. The machine vision system 800 includes a network server 850, cameras A 830a, B 830b, and C 830c (generally referred to as camera 830), and a network 840. The network server 850 includes a computing system A 855a and a computing system B 855b. Each camera A 830a, B 830b, and C 830c includes a transceiver 835a, 835b, and 835c (generally referred to as transceiver 835), respectively. Each camera 830 acquires images and transmits via the transceiver 835 the images to the network server 850 via the network 840. The computing systems A 855a and B 855b process the received images to determine a class associated with each received image utilizing the technology as described herein. It should be understood that the computing systems A 855a and B 855b can include, for example, one or more of the components (e.g., modules, devices, etc.) of the computing system 510.

Figure 9:
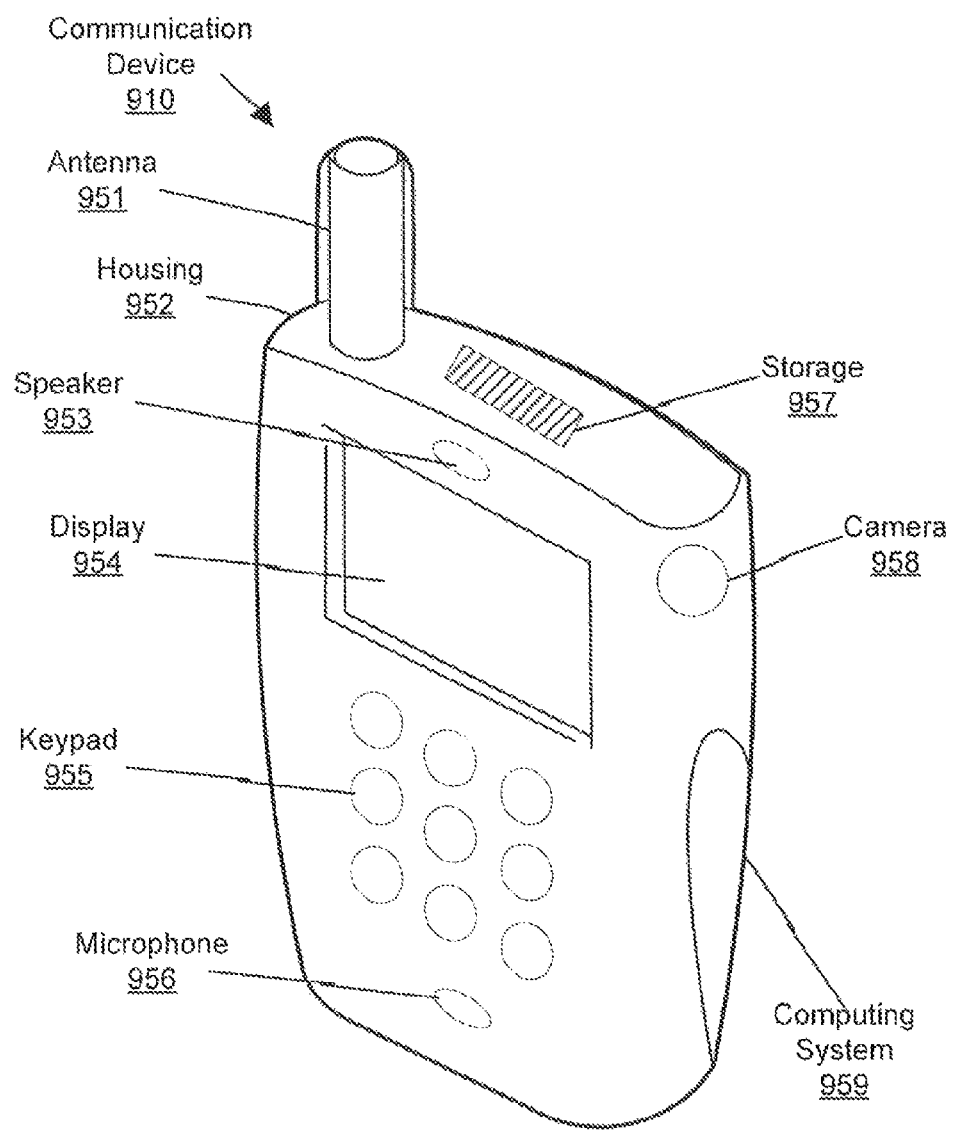
FIG. 9 depicts a block diagram of another exemplary machine vision system.

FIG. 9 depicts a block diagram of another exemplary machine vision system 900. The machine vision system 900 includes a communication device 910 (e.g., mobile phone, personal digital assistant, etc.). The communication device 910 includes an antenna 951, a housing 952, a speaker 953, a display 954, a keypad 955, a microphone 956, storage 957, a camera 958, and a computing device 959. It should be understood that the computing system 959 can include, for example, one or more of the components (e.g., modules, devices, etc.) of the computing system 510.

The antenna 951 is utilized to receive and/or transmit data signals and may be constructed from any known antenna materials. The housing 952 is a casing utilized to hold the components of the computing system 959 (e.g., components illustrated in the computing device 510 of FIG. 5). The casing may be constructed from any known casing materials (e.g., plastic, metal, etc.). The speaker 953 is utilized to reproduce audio. The communication device 910 may include, for example, a speaker output (not shown) that is utilized by an external speaker (e.g., head set, third-party speakers, wireless connected speakers, etc.) to reproduce audio.

The display 954 displays information associated with the image and/or the class associated with the image. The keypad 955 is utilized for input of selections and/or other input information (e.g., name, phone number, etc.). The microphone 956 is utilized for input of audio data (e.g., voice call, instructions, audio recording, etc.). The communication device 910 may include, for example, a microphone output (not shown) that is utilized by an external microphone (e.g., head set, third-party microphone, wireless connected microphone, etc.) to input audio. The storage 957 is utilized to store data (e.g., store multimedia data parts, retrieve multimedia data parts, store phone numbers, etc.). The storage 957 may be any type of memory storage including a removable memory storage and/or a permanent memory storage.

The camera 958 acquires an image and the computing system 959 processes the image to determine a class utilizing the technology as described herein. The computing system 959 can communication the determined class and/or the image to other devices (not shown) utilizing the network (not shown).

Figure 10:
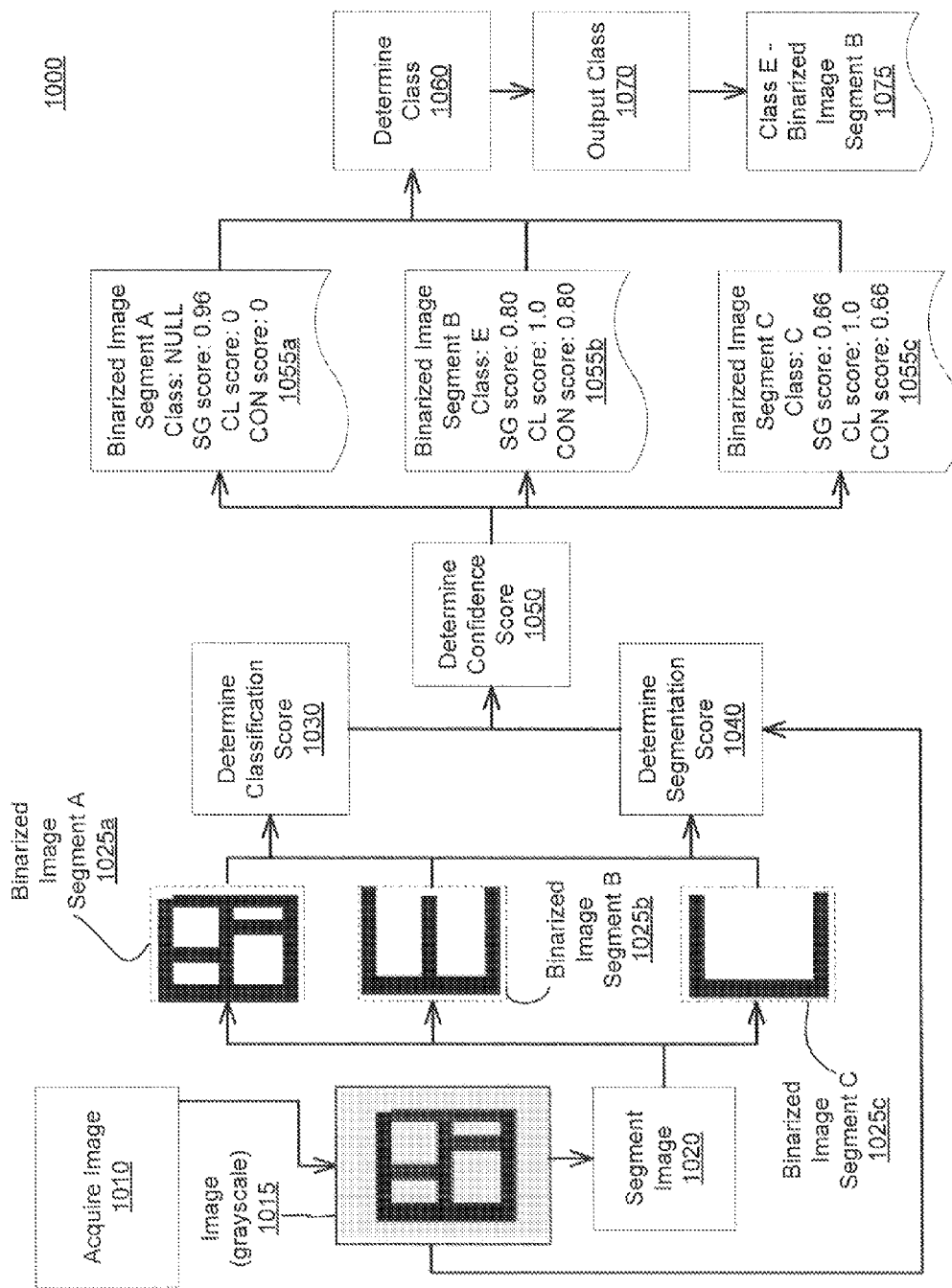
FIG. 10 illustrates a flowchart depicting an analysis of an image.

FIG. 10 illustrates a flowchart 1000 depicting an analysis of an image 1015 utilizing, for example, the computing system 510 of FIG. 5. The image acquisition module 512 acquires (1010) the image 1015 (in this example, the image 1015 is in grayscale) from a locally connected digital camera, from a networked digital camera, and/or from an image database in the storage device 526 or a remote storage device, for example. The segmentation module 513 segments (1020) the image 1015 to form binarized image segments A 1025a, B 1025b, and C 1025c. The classification score module 515 determines (1030) a classification score for each binarized image segment A 1025a, B 1025b, and C 1025c.

For example, for each binarized image segment A 1025a, B 1025b, and C 1025c, the classification score module 515 can determine a classification score for each class in a set of classes. As in this example, the classification score module 515 can then determine the highest classification score (and the corresponding class) for each image segment A 1025a, B 1025b, and C 1025c.

The segmentation score module 514 determines (1040) a segmentation score for each binarized image segment A 1025a, B 1025b, and C 1025c by comparing each binarized image segment and a region of the image 1015 associated with the respective binarized image segment (e.g., the region in the image 1015 outlined by the binarized image segment A 1025a, B 1025b, or C 1025c).

The confidence score module 516 determines (1050) a confidence score 1055a, 1055b, and 1055c associated with each binarized image segment A 1025a, B 1025b, and C 1025c, respectively, based on the segmentation score and the classification score (in this example, by multiplying the segmentation score and the classification score).

The class determination module 517 determines (1060) a class associated with the image 1015 based on the confidence scores 1055a, 1055b, and 1055c associated with the binarized image segments A 1025a, B 1025b, and C 1025c, respectively. In this example, the class associated with the image 1015 is determined to be class E, because binarized image segment B 1025b and corresponding class E yielded the highest confidence score of confidence scores 1055a, 1055b and 1055c. The class output module 518 outputs (1070) the class 1075 to a requesting device or module executing on the computing system 510 or in a remote system (not shown).

FIG. 11 depicts an image 1110 and three binarized image segments A 1120a, B 1120b, and C 1120c with associated scores 1115a, 1115b, and 1115c. The image 1110 can be processed utilizing, for example, the computing system 510 of FIG. 5. The image acquisition module 512 acquires the image 1110 (in this example, the image 1110 is in grayscale).

The segmentation module 513 segments the image 1110 to form the binarized image segments A 1120a, B 1120b, and C 1120c. In this example, the segmentation module 513 binarizes the image 1110 using 3 different threshold levels, threshold levels 220, 90, and 20, to form the binarized image segments A 1120a, B 1120b, and C 1120c, respectively.

The classification score module 515 determines a classification score, classification scores 1.0, 1.0, and 1.0, for each binarized image segment A 1120a, B 1120b, and C 1120c, respectively. As illustrated, the classification score (and the corresponding class) is the same for each of the binarized image segments. In other words, the class of the image 1110 is class A.

The segmentation score module 514 determines a segmentation score, segmentation scores 0.59, 0.88, and 0.58, for each binarized image segment A 1120a, B 1120b, and C 1120c, respectively, by comparing each binarized image segment with a region of the image 1110 associated with the respective binarized image segment. In this example, the segmentation score varies because the binarized image segments A 1120a, B 1120b, and C 1120c exhibit varying degrees of erosion and dilation compared to the image 1110. The binarized image segment B 1120b more closely represents the image 1110 than the binarized image segment A 1120a that exhibits dilation or the binarized image segment C 1120c that exhibits erosion.

The confidence score module 516 determines a confidence score, confidence scores 0.59, 0.88, and 0.58, associated with each binarized image segment A 1120a, B 1120b, and C 1120c, respectively, based on the segmentation score and the classification score (in this example, the confidence score module 516 determines the confidence score by multiplying the segmentation score by the classification score).

The class determination module 517 determines a class associated with the image 1110 based on the confidence scores 1115a, 1115b, and 1115c associated with the binarized image segments A 1120a, B 1120b, and C 1120c, respectively. In this example, the class associated with the image 1110 is determined to be class A, because the binarized image segment B 1120b and corresponding class A yielded the highest confidence score. The class output module 518 outputs the determined class—class A—and/or the binarized image segment B 1120b to a requesting device or module executing on the computing system 510 or in a remote system (not shown).

In some examples, the precise location, dimensions, and/or boundary of the image segment in the image is determined. This determination can be in addition to recognizing or determining the class associated with an image.

In the example of FIG. 11, the image 1110 (or a larger image containing the image 1110 such as the image 116 in FIG. 1 depicting multiple characters) showing in annotation the image segment, the determined class, and the associated confidence score is displayed for a user. In this example, although the three image segments correctly classify the image 1110 as class A, the image 1110 can be annotated with a bounding box, boundary, or other region associated with the binarized image segment B 1120b, which yielded the highest confidence score.

Although FIG. 11 illustrates an image segment that is recognized or classified as a character, various other objects can be recognized or classified by the technology described herein, e.g., a manufactured part, tissue or bone in a medical image, etc. In the example of a manufactured part, a determination of the precise location and dimensions of the part in the image can be utilized for other applications. The image coordinates $x_i$, $y_i$ of the part in the image 116 of FIG. 1 can be, for example, converted into real world coordinates $x_w$ and $y_w$, as illustrated in FIG. 1. These real world coordinates $x_w$ and $y_w$ can be, for example, used by a pick and place machine to pick up and place the part, e.g., based on the result of the classification.

Figure 12:
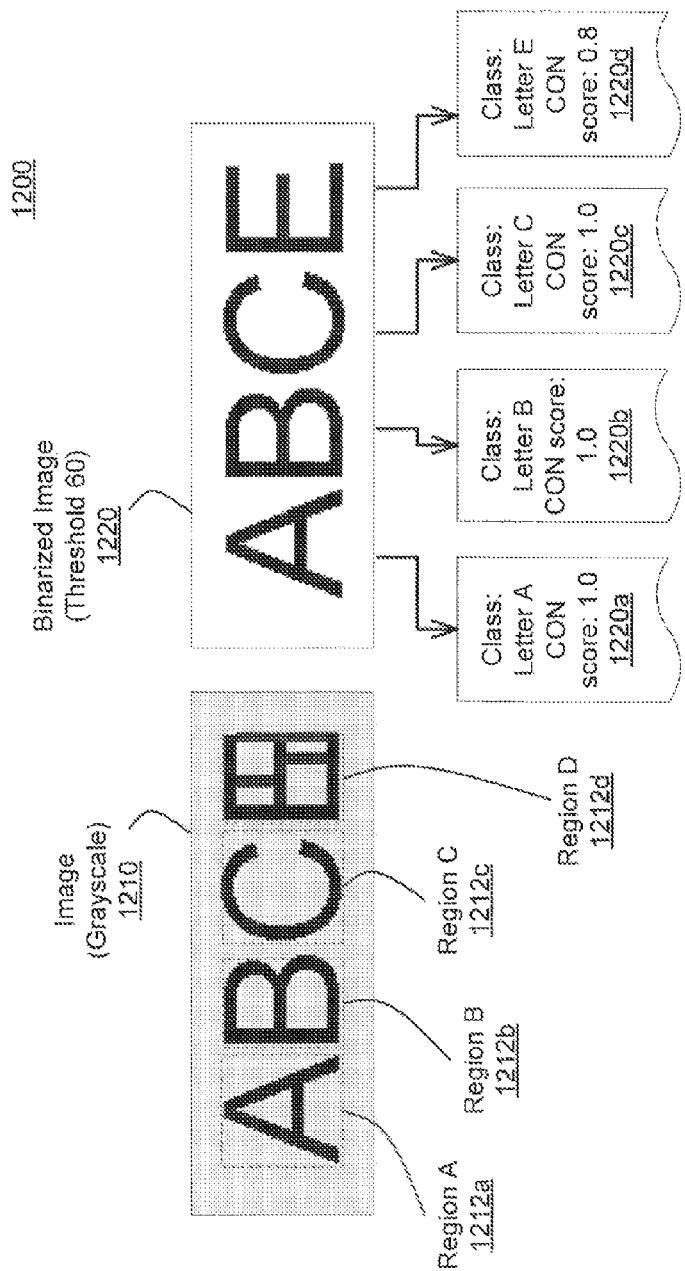
FIG. 12 depicts an image and a binarized image with individual classifications.

FIG. 12 depicts an image 1210 and a binarized image 1220 with individual classifications 1220a, 1220b, 1220c, and 1220d. Regions A 1212a, B 1212b, C 1212c, and D 1212d are illustrated in the image 1210. The regions A 1212a, B 1212b, C 1212c, and D 1212d can correspond to the image segments within the binarized image 1220. As described herein, the image 1210 is binarized to form the binarized image 1220. The individual classifications 1220a, 1220b, 1220c, and 1220d, i.e., Letter A, Letter B, Letter C, and Letter E, respectively, are determined based on the confidence scores for each image segment.

The class determination module 517 can determine, for example, if the determined classifications meet one or more criteria (e.g., a pre-defined number of classifications associated with an image, a high confidence score for any one classification, a set length, a set size, etc.). In this example, initially four classifications 1220a, 1220b, 1220c, and 1220d are determined, while the criteria associated with the image 1210 indicates that there should only be three classifications. The class determination module 517 processes the classifications based on this criteria and outputs only the three classifications 1220a, 1220b, and 1220c and disregards the classification 1220d that yielded the lowest confidence score—0.8—of the four classifications 1220a, 1220b, 1220c, and 1220d as illustrated in Table 1.

TABLE 1

Exemplary Action based on Classification Criteria

| Image Region | Classification | Confidence Score | Action |
| --- | --- | --- | --- |
| A 1212a | A | 1.0 | Output |
| B 1212b | B | 1.0 | Output |
| C 1212c | C | 1.0 | Output |
| D 1212d | E | 0.8 | Disregard |

Figure 13:
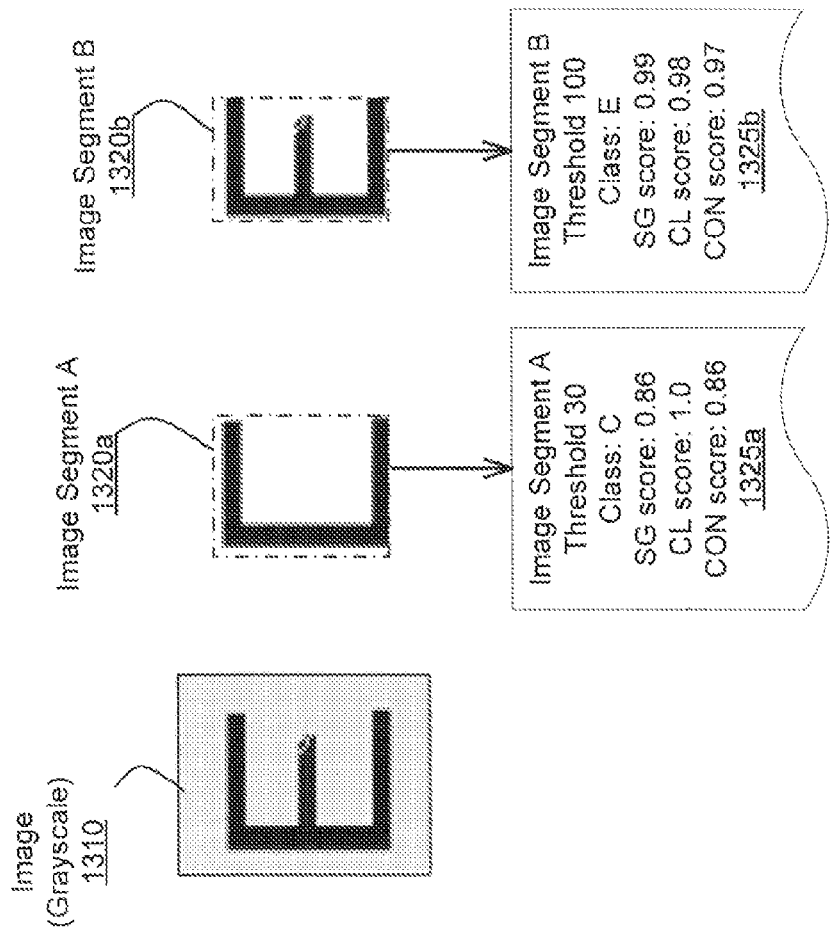
FIG. 13 depicts an image and two image segments with associated scores.

FIG. 13 depicts an image 1310 and two image segments A 1320a and B 1320b obtained by thresholding image 1310 at threshold levels 30 and 100, respectively, with associated scores 1325a and 1325b. As illustrated, the image 1310 depicts the letter "E." The image segment A 1320a is classified as the letter "C" with a perfect classification score of 1.0. The image segment B 1320b is classified as the letter "E," but due to a flaw in the image 1310, with a lower classification score—0.98—than the classification score for the image segment A 1320a. As a result, based on the classifications scores alone, the image 1310 would be incorrectly classified as the letter "C". However, in this example, since the confidence score utilizes both the segmentation score and the classification score, the confidence score is higher for the correct classification of the letter "E"—the confidence level for the image segment B 1320b is 0.97. In other words, although the image segment A 1320a has a higher classification score than the image segment B 1320b, the correct classification is determined—class E—since the classification determination is based on the confidence score that is based on both the classification score and the segmentation score. In this example, the image segment B 1320b more closely resembles the original image 1310 (e.g., more corresponding pixels match, the edge contours more closely match, etc.).

Figure 17:
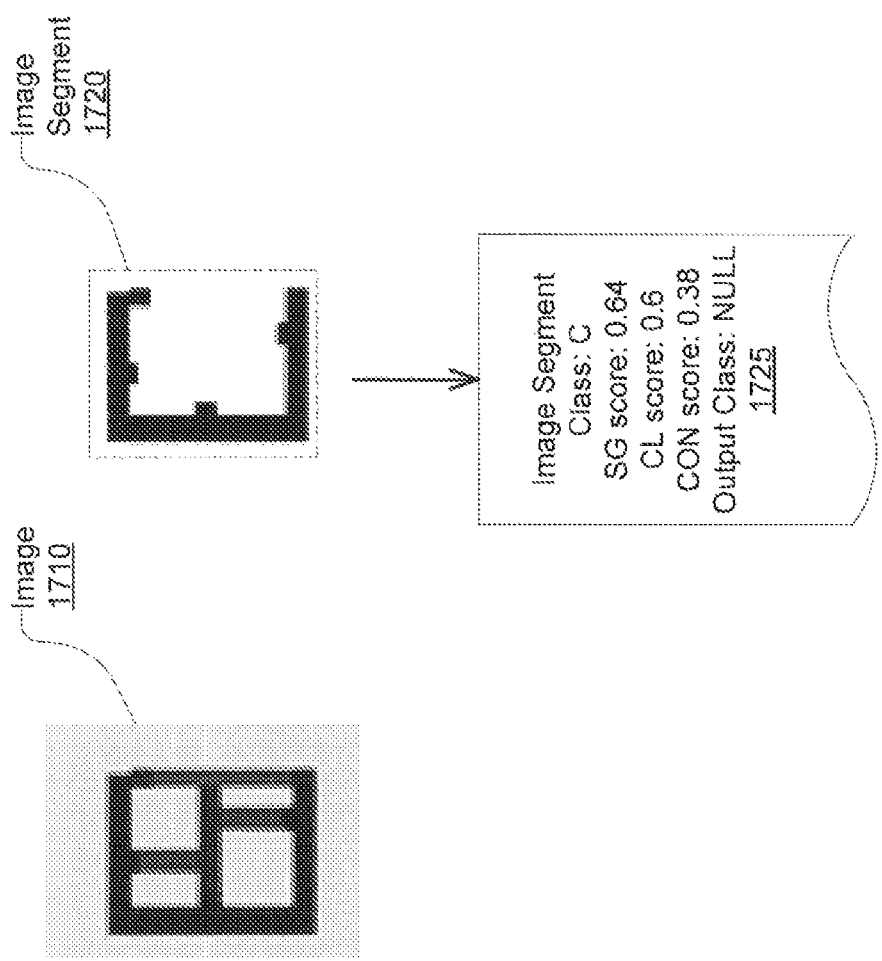
FIG. 17 depicts an image and an image segment.

FIG. 17 depicts an image 1710, an image segment 1720 resulting from the segmentation of the image 1710, and associated scores 1725. In this example, although the classification score module 515 determines a classification score for class "C" of 0.6, the class determination module 517 rejects the class "C" and instead returns the class "NULL", because the confidence score of 0.38 is below a predefined threshold of 0.5.

As illustrated in the previous examples, the class determination module 517 can validate or reject an image segment and its corresponding classification based on the confidence score of the image segment and one or more criteria, such as, by comparing the confidence score to a threshold value, a range, or to the confidence score of one or more other image segments. The threshold value or range can be predefined (e.g., defined by the user) or dynamically determined (e.g., determined based on the average or mode of the confidence scores of other image segments associated with the image, etc.). For example, the class determination module 517 can reject an image segment and classification by returning a "NULL" identifier for the classification of the image segment or by not returning a result.

Figure 14:
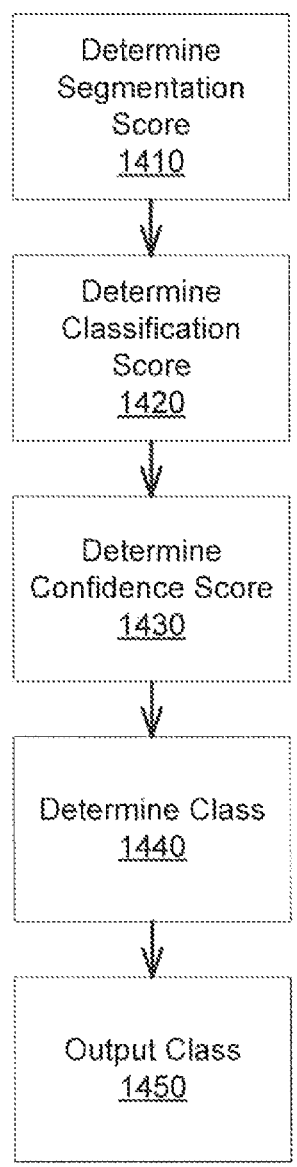
FIG. 14 illustrates a flowchart depicting determining and outputting a class associated with an image.

FIG. 14 illustrates a flowchart 1400 depicting determining and outputting a class associated with an image utilizing, for example, the computing system 510 of FIG. 5. The segmentation score module 514 determines (1410) a segmentation score based on a comparison of an image segment and a region of an image. The region of the image is associated with the image segment. The classification score module 515 determines (1420) a classification score indicative of a similarity between the image segment and at least one class. The confidence score module 516 determines (1430) a confidence score for the image segment based on the segmentation score and the classification score. The class determination module 517 determines (1440) a class associated with the image based on the confidence score. The class output module 518 outputs (1450) the class associated with the image.

Figure 15:
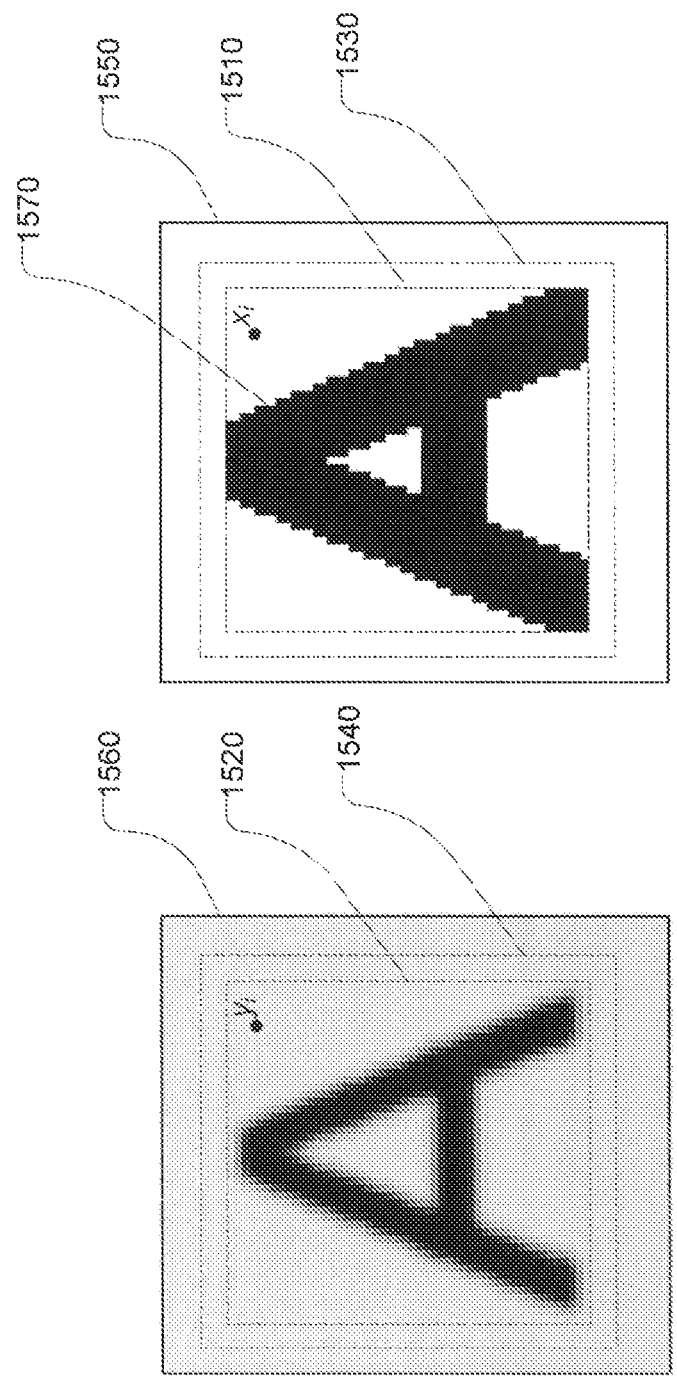
FIG. 15 depicts a grayscale image and a binary image utilized for determining an exemplary segmentation score.

FIG. 15 depicts a grayscale image 1560 and a binary image 1550 utilized for determining an exemplary segmentation score. As further described herein, the segmentation module 513 of FIG. 5 can generate an image segment by binarizing the grayscale image 1560 to obtain the binarized image 1550 and, then, identifying a connected component 1570 in the binary image 1550. The segmentation module 513 can also identify a portion 1510 of the binary image 1550 within a bounding box of the connected component 1570 or identify a portion 1530 of the binary image 1550 including the bounding box of the connected component 1570 with an additional margin. In this example, the "binarized image segments" or "image segments" can refer to the connected component 1570 or the portions 1510 or 1530 of the binary image 1550 containing the connected component 1570.

As further described herein, the segmentation score module 514 of FIG. 5 can determine a segmentation score based on a comparison of an image segment and a corresponding region in the non-segmented image, such as, based on a comparison of pixels in the image segment and pixels in the corresponding region in the non-segmented image. For example, the segmentation score module 514 can determine a segmentation score between the portion 1510 of the binary image 1550 and a corresponding portion 1520 of the grayscale image 1560, e.g., where the portions 1510 and 1520 have the same location and dimensions. For example, the segmentation score can be the normalized grayscale correlation (e.g., as defined below) between the binary image region 1510 (image x in the equation below) and the grayscale image region 1520 (image y in the equation below).

In another example, the segmentation score module 514 can determine a segmentation score (e.g., the normalized grayscale correlation) between the portion 1530 of the binary image 1550 and a corresponding portion 1540 of the grayscale image 1560.

Figure 16:
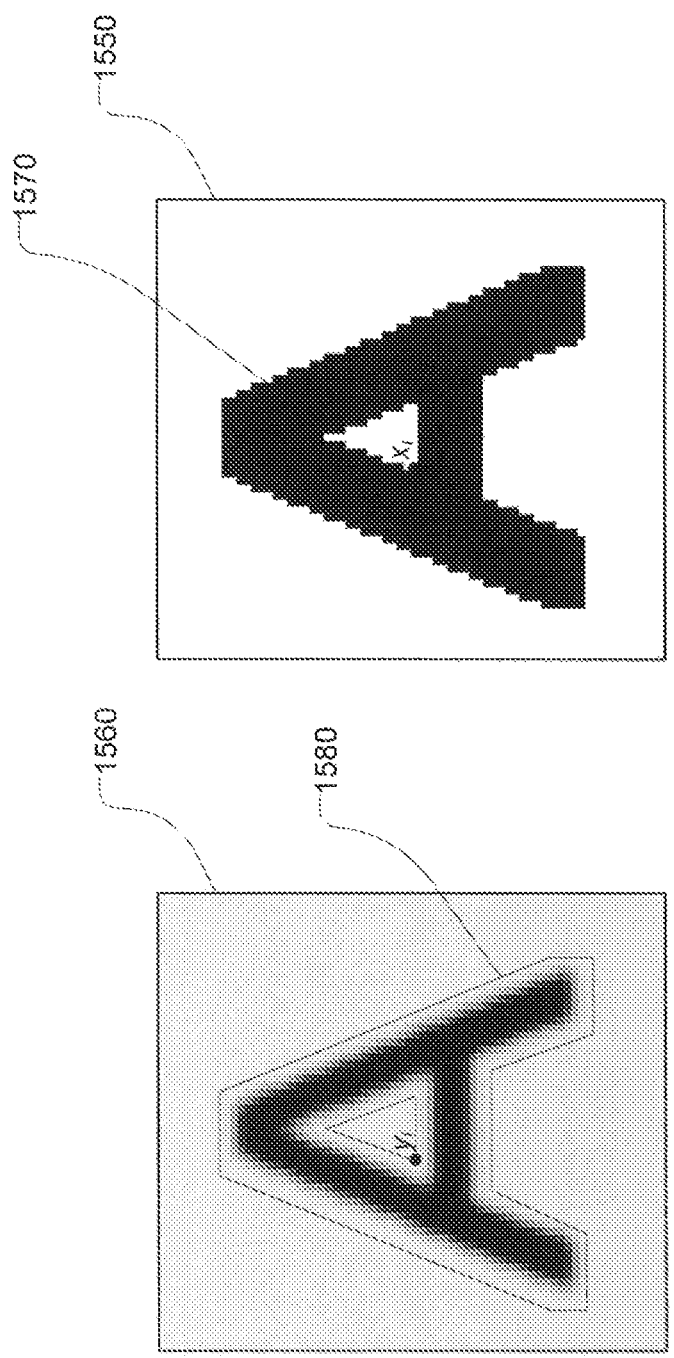
FIG. 16 depicts the grayscale image and the binary image of FIG. 15 utilized for determining another exemplary segmentation score.

FIG. 16 depicts the grayscale image 1560 and the binary image 1550 of FIG. 15 utilized for determining another exemplary segmentation score. In some examples, the segmentation score module 514 determines the segmentation score between the connected component 1570 (optionally surrounded by a margin of background pixels—not shown) in the binary image 1550 and a corresponding region 1580 in the grayscale image 1560. In other examples, the segmentation score module 514 sub-samples the images prior to determination of the segmentation score.

In other examples, the region in the binary image and the corresponding region in the image are selected based on one or more parameters. For example, the regions are selected based on a pre-determined size (e.g., one hundred pixels by one hundred pixels, etc.), a pre-determined shape (e.g., circular, rectangle, square, etc.), and/or any other type of selection criteria (e.g., five pixels of white space surrounding the object segment, only include foreground pixels, include 90% foreground pixels and 10% background pixels, shape fitted to object, etc.).

In some examples, the segmentation score module 514 determines the segmentation score for an image segment by comparing a set of pixels in the image segment (e.g., all pixels, a sub-sampled set of pixels, a randomly-selected set of pixels, edge pixels, etc.) with a corresponding set of pixels in the non-segmented image. In other examples, the segmentation score module 514 determines the segmentation score for an image segment by comparing each pixel in the image segment with a corresponding pixel in the non-segmented image. The comparison of the pixels can be, for example, a binary comparison (e.g., the comparison result is either zero or one) and/or a relative comparison (e.g., the comparison result is between zero and one). The comparison of the pixels can be combined (for example, added, averaged, weighted, multiplied, etc.) to determine the segmentation score.

In some examples, the segmentation score module 514 determines a segmentation score based on a correlation operation between two images or image regions. The segmentation score can be, for example, based on a normalized correlation. For example, the segmentation score can be based on a normalized grayscale correlation. The normalized grayscale correlation between an image x and an image y can be, for example, as depicted in Equation 1.

Normalized Grayscale Correlation Equation        Equation 1

$$r_{xy} = \frac{\sum x_i y_i - n\overline{x}\overline{y}}{(n-1)s_x s_y} = \frac{n\sum x_i y_i - \sum x_i \sum y_i}{\sqrt{\sum x_i^2 - (\sum x_i)^2}\sqrt{n\sum y_i^2 - (\sum y_i)^2}}.$$

where:
n is the number of pixels in images x and y;
$x_i$ represents the intensity of the $i^{th}$ pixel in image x; and
$y_i$ represents the intensity of the $i^{th}$ pixel in image y.

Table 2 illustrates an exemplary comparison of corresponding pixels in the image segment and the non-segmented image utilizing a binary comparison of the pixels (i.e., "1" if the pixels match and "0" otherwise). In this example, the pixels are represented using red green blue (RGB) intensity values. As illustrated in Table 2, the segmentation score is 0.67 based on the average of the comparison values.

TABLE 2

Binary Comparison of Pixels

| Pixel Location | Image Segment | Image | Comparison |
|---|---|---|---|
| 0x0 | (0.4, 0.3, 0.4) | (0.0, 0.0, 0.0) | 0 |
| 0x1 | (0.23, 0.54, 0.87) | (0.23, 0.54, 0.87) | 1 |
| 0x2 | (0.23, 0.54, 0.87) | (0.23, 0.54, 0.87) | 1 |
| 1x0 | (0.23, 0.24, 0.87) | (0.23, 0.23, 0.87) | 0 |
| 1x1 | (0.23, 0.54, 0.86) | (0.23, 0.54, 0.86) | 1 |
| 1x2 | (0.23, 0.54, 0.85) | (0.23, 0.54, 0.85) | 1 |
| 2x0 | (0.23, 0.44, 0.87) | (0.23, 0.34 0.87) | 0 |
| 2x1 | (0.23, 0.54, 0.84) | (0.23, 0.54, 0.84) | 1 |
| 2x2 | (0.23, 0.54, 0.83) | (0.23, 0.54, 0.83) | 1 |
| | | Sum | 6 |
| | | Number of Pixels | 9 |
| | Segmentation Score (Sum/Number of Pixels) | | 6/9 = 0.67 |

Table 3 illustrates another exemplary comparison of corresponding pixels in the image segment and the non-segmented image utilizing a relative comparison of the pixels (i.e., the comparison value is between 0 and 1 based on the difference between the pixel values). In this example, the pixels are represented using red green blue (RGB) intensity values. As illustrated in Table 3, the segmentation score is 0.86 based on the average of the comparison values.

TABLE 3

Relative Comparison of Pixels

| Pixel Location | Image Segment | Image | Comparison |
|---|---|---|---|
| 0x0 | (0.4, 0.3, 0.4) | (0.0, 0.0, 0.0) | 0.0 |
| 0x1 | (0.23, 0.54, 0.87) | (0.23, 0.54, 0.87) | 1.0 |
| 0x2 | (0.23, 0.54, 0.87) | (0.23, 0.54, 0.87) | 1.0 |
| 1x0 | (0.23, 0.24, 0.87) | (0.23, 0.23, 0.87) | 0.87 |
| 1x1 | (0.23, 0.54, 0.86) | (0.23, 0.54, 0.86) | 1.0 |
| 1x2 | (0.23, 0.54, 0.85) | (0.23, 0.54, 0.85) | 1.0 |
| 2x0 | (0.23, 0.44, 0.87) | (0.23, 0.34 0.87) | 0.83 |
| 2x1 | (0.23, 0.54, 0.84) | (0.23, 0.54, 0.84) | 1.0 |
| 2x2 | (0.23, 0.54, 0.83) | (0.23, 0.54, 0.83) | 1.0 |
| | | Sum | 7.7 |
| | | Number of Pixels | 9 |
| | Segmentation Score (Sum/Number of Pixels) | | 7.7/9 = 0.86 |

In some examples, the segmentation score module 514 determines the segmentation score for an image segment based on a comparison of pixels that is not "one-to-one". For example, the segmentation score can be determined by comparing a "statistical indicator" computed on a set of pixels in the image segment with a statistical indicator computed on a corresponding set of pixels in the non-segmented image. For example, the statistical indicator can be the mean value or the median value of the intensities of the set of pixels, the standard deviation of the intensities from the mean intensity value, a histogram of the intensities, a horizontal or vertical projection of the intensities, or any other suitable statistical indicator. The intensities can be, for example, grayscale values, RGB values, binary values, etc. In another example, the segmentation score can be determined by computing a statistical indicator on a set of pixels in the non-segmented image corresponding to a set of pixels in the image segment and comparing it with an expected value or range associated with the image segment. For example, referring to FIG. 16, the segmentation score can be determined by computing a standard deviation of the grayscale intensities of pixels in region 1580 of grayscale image 1560 corresponding to the connected component 1570 and comparing it with an expected standard deviation.

In some examples, the segmentation score module 514 determines the segmentation score for an image segment based on a comparison of image moments. For example, the segmentation score is determined by comparing moments computed on a set of pixels in the image segment with moments computed on a corresponding set of pixels in the non-segmented image. The moments can be ordinary moments or central moments of any order. The moments can be any type of image moment (e.g. standard moments, geometric moments, Zernike moments, Hu moments, etc.). In some examples, multiple moments (e.g., of different orders, of different types) can be combined to form a "moment vector", and the segmentation score can be determined by comparing a moment vector computed from the image segment with a moment vector computed from the non-segmented image. The comparison can be a distance (e.g., a Euclidean distance) between the vectors, a correlation between the vectors, or any other type of comparison.

In some examples, the segmentation score module 514 can determine multiple intermediate segmentation scores using different techniques (e.g., normalized correlation, statistical analysis, moments analysis, etc.) and determine a final segmentation score based on the intermediate segmentation scores (e.g., by averaging the intermediate segmentation scores, adding the intermediate segmentation scores, determining a median or mode of the intermediate segmentation scores, etc.). As illustrated in Tables 2 and 3 above, the binary comparison of the pixels and the relative comparison of the pixels provide different segmentation scores. In this example, the segmentation score module 514 can average the two segmentation scores to determine a final segmentation score of $(0.67+0.86)/2=0.765$.

In some examples, the classification score module 515 determines the classification score for an image segment and at least one class using an artificial intelligence (AI) based classifier. For example, during a training or learning phase, the AI based classifier can be presented a training set, from which the classifier will learn to recognize characteristics associated with a particular class.

For example, the training set can include, for each class, image segments (or images) that belong to the class and/or image segments (or images) that do not belong to the class. For example, a training set for the character class "A" can include images (or image segments) of the letter A in various fonts, sizes and exhibiting various deformations. The training set for the character class "A" can also include images (or image segments) of characters or objects other than the letter A. The training set can include, for example, labels identifying the class of each image segment (e.g., image segment 123b associated with class "A", image segment 342c associated with class "$", etc.). In other examples, a user inputs the class for each image segment (e.g., the user inputs the class via a keyboard, etc.).

The AI based classifier can, for example, utilize any type of AI technique (e.g., a boosting algorithm, Adaboost, GentleBoost, a neural network, a support vector machine, a k-nearest neighbor method, an expert system, a Bayesian belief network, a fuzzy logic system, a decision tree, etc.). For example, the training phase can include extracting features from the image segments of the training set and the classification score can be determined using similar features extracted from the image segment to be classified.

In some examples, the classification score module 515 determines a classification score for each class in a set of classes. For example, for the image segment B 1025b of FIG. 10, the classification score module 515 can determine the classification score for each class in the set of letter classes as illustrated in Table 4. The classification score module 515 can then determine the class with the highest classification score (in this example, class E with a classification score of 1.0) and return the determined class and the corresponding classification score to the confidence score module 516.

TABLE 4

Classification Scores for Classes

| Class | Classification Score |
|---|---|
| A | 0.00 |
| B | 0.68 |
| C | 0.54 |
| D | 0.10 |
| E | 1.00 |
| F | 0.85 |
| G | 0.00 |
| H | 0.31 |
| I | 0.00 |
| J | 0.00 |
| K | 0.00 |
| L | 0.13 |
| M | 0.00 |
| N | 0.00 |
| O | 0.00 |
| P | 0.32 |
| Q | 0.00 |
| R | 0.00 |
| S | 0.00 |
| T | 0.00 |
| U | 0.12 |
| V | 0.00 |
| W | 0.00 |
| X | 0.00 |
| Y | 0.00 |
| Z | 0.00 |

In other examples, the set of classes can be, for example, a pre-defined set of classes (e.g., letter characters, digit characters, alphanumeric characters, part classes, vehicle classes, organ classes, etc.) and/or a dynamically defined set of classes (e.g., language analysis to determine set of classes, analysis to determine if string includes letters, etc.).

In some examples, the computing system 510 executes the following steps for an image in the case of multiple segments and multiple classes. For each segmentation i of an image, resulting in a segmented object i and corresponding region i in image:

(1) Determine $SG_i$ (segmented object i, region i);
(2) For each class j belonging to pre-defined set of classes: Determine $CL_{ij}$ (segmented object i, class j);
(3) Determine $class_{i,max}$ that yielded highest $CL_{ij}$ for segmented object i, $CL_{i,max}$;
(4) Determine $CON_{i,max}(class_{i,max}) = SG_i * CL_{i,max}$;
(5) Once all segmentations have been processed: Return $class_{max}$ that yielded highest $CON_{i,max}$.

Step 1 can be, for example, performed in parallel with and/or after steps 2-3.

In other examples, the confidence score module 516 determines the confidence score by weighting the segmentation score and/or the classification score. In some examples, the confidence score module 516 determines the confidence score by selecting a highest score, a lowest score, an average score, a mean score, and/or any other selection process. Exemplary equations and/or weighting factors for determining the confidence score follow below. It should be understood that any variety and/or combination of the equations and/or weighting factors described herein can be utilized to determine the confidence score based on the segmentation score and the classification score.

(i) Confidence Score=Segmentation Score+Classification Score
(ii) Confidence Score=Segmentation Score×Classification Score
(iii) Confidence Score=(Segmentation Score+Classification Score)/2
(iv) Confidence Score=(Segmentation Score×2)+Classification Score
(v) Confidence Score=Segmentation Score+(Classification Score×1.5)
(vi) Confidence Score=(Segmentation Score×2.8)+(Classification Score×2.9)

In some examples, the class output module 518 outputs the class or classes as ASCII text (e.g., "02 2009") and/or in any other computer readable format (e.g., unicode, binary, etc.). The output of the classes can be, for example, via an application programming interface (API) call, a return call from a request for the class(es) associated with an image, and/or any other type of communication between software, hardware, and/or other computing devices.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site and/or can be any form of computer executable instructions.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a graphics processor, a video card, a FPGA (field programmable gate array), and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The computer system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for determining a class associated with an image, the method comprising:
   generating at least one image segment based on a segmentation of the image;
   determining a segmentation score for an image segment included in the at least one image segment based on a comparison of the image segment and a region of the image, the region of the image associated with the image segment;
   determining a confidence score for the image segment based on the segmentation score and a classification score, the classification score indicative of a similarity between the image segment and at least one class;
   determining a class associated with the image based on the confidence score; and
   outputting the class associated with the image.

2. The method of claim 1, wherein the at least one image segment includes a plurality of image segments, wherein the image segment is a first image segment, wherein the confidence score is a first confidence score, wherein the region of the image is a first region of the image and wherein the method further comprises:
   determining a second segmentation score for a second image segment included in the plurality of image segments based on a comparison of the second image segment and a second region of the image, the second region of the image associated with the second image segment; and
   determining a second confidence score for the second image segment based on the second segmentation score and a second classification score, the second classification score indicative of a similarity between the second image segment and the at least one class.

3. The method of claim 2, wherein the determining the class associated with the image further comprises determining the class associated with the image based on the first confidence score and the second confidence score.

4. The method of claim 2, further comprising generating the first image segment and the second image segment based on a first segmentation and a second segmentation, respectively, of substantially the same region of the image.

5. The method of claim 2, further comprising generating the first image segment and the second image segment based on a segmentation of regions of the image substantially distinct from one another.

6. The method of claim 1, further comprising comparing pixels of the image segment with pixels of the region of the image to form the comparison of the image segment and the region of the image.

7. The method of claim 1, further comprising determining the classification score indicative of the similarity between the image segment and the at least one class.

8. The method of claim 1, further comprising determining the at least one class based on a comparison of the image segment with a plurality of classes, each of the plurality of classes associated with a character.

9. The method of claim 1, further comprising:
receiving the image from an image acquisition device;
binarizing the image to form a binarized image; and
segmenting the binarized image based on objects within the binarized image to form the image segment.

10. The method of claim 1, wherein the determining the class associated with the image further comprising determining the class associated with the image based on the confidence score by comparing the confidence score to a threshold value.

11. An apparatus comprising:
a camera configured to acquire an image;
at least one processor coupled to the camera; and
a computer storage medium storing instructions that, when executed by the at least one processor, cause the at least one processor to perform operations including:
generating at least one image segment based on a segmentation of the image;
determining a segmentation score for an image segment included in the at least one image segment based on a comparison of the image segment and a region of the image, the region of the image associated with the image segment;
determining a confidence score for the image segment based on the segmentation score and a classification score, the classification score indicative of a similarity between the image segment and at least one class;
determining a class associated with the image based on the confidence score; and
outputting the class associated with the image.

12. A system for determining a class associated with an image, the system comprising:
at least one processor;
a segmentation module configured to employ the at least one processor to generate at least one image segment based on a segmentation of the image;
a segmentation score module configured to employ the at least one processor to determine a segmentation score for an image segment included in the at least one image segment based on a comparison of the image segment and a region of the image, the region of the image associated with the image segment;
a confidence score module configured to employ the at least one processor to determine a confidence score for the image segment based on the segmentation score and a classification score, the classification score indicative of a similarity between the image segment and at least one class;
a class determination module configured to employ the at least one processor to determine a class associated with the image based on the confidence score; and
a class output module configured to employ the at least one processor to output the class associated with the image.

13. The system of claim 12, wherein the at least one image segment includes a plurality of image segments, wherein the image segment is a first image segment, wherein the confidence score is a first confidence score, wherein the region of the image is a first region of the image, and wherein the system further comprises:
the segmentation score module further configured to employ the at least one processor to determine a second segmentation score for a second image segment included in the plurality of image segments based on a comparison of the second image segment and a second region of the image, the second region of the image associated with the second image segment; and
the confidence score module further configured to employ the at least one processor to determine a second confidence score for the second image segment based on the second segmentation score and a second classification score, the second classification score indicative of a similarity between the second image segment and the at least one class.

14. The system of claim 13, further comprising:
the class determination module further configured to employ the at least one processor to determine the class associated with the image based on the first confidence score and the second confidence score.

15. The system of claim 13, further comprising the segmentation module further configured to employ the at least one processor to generate the first image segment and the second image segment based on a first segmentation and a second segmentation, respectively, of substantially the same region of the image.

16. The system of claim 13, further comprising the segmentation module further configured to employ the at least one processor to generate the first image segment and the second image segment based on a segmentation of regions of the image substantially distinct from one another.

17. The system of claim 12, further comprising the segmentation score module further configured to employ the at least one processor to compare pixels of the image segment with pixels of the region of the image to form the comparison of the image segment and the region of the image.

18. The system of claim 12, further comprising a classification score module configured to employ the at least one processor to determine the classification score indicative of the similarity between the image segment and the at least one class.

19. The system of claim 12, further comprising a classification score module configured to employ the at least one processor to determine the at least one class based on a comparison of the image segment with a plurality of classes, each of the plurality of classes associated with a character.

20. The system of claim 12, further comprising:
an image acquisition module configured to employ the at least one processor to receive the image,
wherein the segmentation module is further configured to employ the at least one processor to:
binarize the image to form a binarized image; and
segment the binarized image based on objects within the binarized image to form the image segment.

21. The system of claim 12, further comprising the class determination module further configured to employ the at least one processor to determine the class associated with the image based on the confidence score by comparing the confidence score to a threshold value.

* * * * *